(12) United States Patent
Pallen et al.

(10) Patent No.: US 10,616,928 B2
(45) Date of Patent: Apr. 7, 2020

(54) INTELLIGENT AUTO-JOIN OF WIRELESS NETWORKS

(71) Applicant: Apple Inc., Cupertino, CA (US)

(72) Inventors: Vinesh Pallen, Sunnyvale, CA (US); Ronald K. Huang, San Jose, CA (US); Chaitanya Mannemala, Fremont, CA (US); Christopher R. Purcell, Dublin, CA (US); Sriram Lakshmanan, Fremont, CA (US)

(73) Assignee: APPLE INC., Cupertino, CA (US)

( * ) Notice: Subject to any disclaimer, the term of this patent is extended or adjusted under 35 U.S.C. 154(b) by 47 days.

(21) Appl. No.: 15/717,053

(22) Filed: Sep. 27, 2017

(65) Prior Publication Data

US 2019/0098674 A1 Mar. 28, 2019

(51) Int. Cl.
| | | |
|---|---|---|
| *H04W 76/10* | (2018.01) | |
| *H04W 4/02* | (2018.01) | |
| *H04W 48/18* | (2009.01) | |
| *H04W 64/00* | (2009.01) | |
| *H04W 84/12* | (2009.01) | |
| *H04W 24/08* | (2009.01) | |
| *H04W 48/16* | (2009.01) | |

(52) U.S. Cl.
CPC ........... *H04W 76/10* (2018.02); *H04W 4/023* (2013.01); *H04W 48/18* (2013.01); *H04W 64/00* (2013.01); *H04W 24/08* (2013.01); *H04W 48/16* (2013.01); *H04W 84/12* (2013.01)

(58) Field of Classification Search
CPC ..... H04W 76/10; H04W 4/023; H04W 84/12; H04W 24/08; H04W 36/14; H04W 48/20; H04W 64/00; H04W 48/18; H04W 48/16; H04W 40/246; H04L 43/0811; H04L 47/10
See application file for complete search history.

(56) References Cited

U.S. PATENT DOCUMENTS

| | | | | |
|---|---|---|---|---|
| 2007/0268877 | A1* | 11/2007 | Buckley ................ | H04W 48/18 370/338 |
| 2013/0295962 | A1* | 11/2013 | Manroa .................. | H04W 4/02 455/456.3 |
| 2015/0334618 | A1* | 11/2015 | Gillett ................... | H04W 48/04 370/338 |
| 2018/0049115 | A1* | 2/2018 | Lai ........................ | H04W 64/00 |
| 2018/0184363 | A1* | 6/2018 | Van Hamersveld .. | H04W 48/20 |

* cited by examiner

*Primary Examiner* — Ricardo H Castaneyra
(74) *Attorney, Agent, or Firm* — Sterne, Kessler, Goldstein & Fox P.L.L.C.

(57) ABSTRACT

Embodiments for performing, by a wireless device, a procedure for auto-joining a wireless network based on factors associated with the wireless networks are provided. The embodiments include determining a current location of the wireless device. The wireless device stores information regarding nearby known networks associated with the current location of the wireless device and may select a candidate network from the nearby known networks based on a network score associated with the candidate network.

21 Claims, 13 Drawing Sheets

INTELLIGENT AUTO-JOIN OF WIRELESS NETWORKS

FIELD

This disclosure generally relates to auto-joining wireless networks.

BACKGROUND

Wi-Fi networks have grown beyond home networks and include Wi-Fi networks provided by public hotspots (e.g., offered by service providers). Public and private Wi-Fi networks are becoming ubiquitous to the point where a wireless device has a number of Wi-Fi access options at a location where coverage of these Wi-Fi networks overlap. A wireless device's connection to one of these networks can sometimes frustrate users due to the wireless device connecting to, for example, a non-preferred network or to a network with a poor signal.

SUMMARY

The present disclosure provides method, apparatus, and computer program product embodiments, and combinations and sub-combinations thereof, for intelligent auto-join through network learning and opportunistic transitioning.

The techniques for intelligent auto-join disclosed herein consider factors associated with each wireless network such as, for example, one or more metrics associated with the wireless networks. Consideration of these factors to determine which wireless network is preferred for auto-joining represents intelligent auto-join. The embodiments of intelligent auto-join disclosed herein also determine network scores for known networks, e.g., for the purpose of ranking networks to determine a preferred network to join based on a wireless device's current location. In some embodiments, networks with higher network scores are preferred over networks with lower network scores. Moreover, intelligent auto-join enables wireless devices to opportunistically transition to better networks when connected to a network with a lower network score.

In some embodiments, the method of intelligent auto join may include determining a current location of the wireless device and generating a nearby known network (NBKN) list based on at least one known network the wireless device has previously joined and on the current location of the wireless device. The wireless device may also select a candidate network from the NBKN list based on a network score assigned to the candidate network. Further, the wireless device may scan a previously-used channel associated with the candidate network to generate a scan result and attempts to join the candidate network in response to the candidate network being included in the scan result.

Some embodiments relate to a wireless device with a processor and memory. The memory is configured to store instructions. The processor is configured to perform operations in response to executing the instructions. The operations include determining a current location of the wireless device and generating an NBKN list based on at least one known network the wireless device has previously joined and on the current location of the wireless device. The operations may also include selecting a candidate network from the NBKN list based on a network score assigned to the candidate network. The operations may also include scanning a previously-used channel associated with the candidate network to generate a scan result and attempting to join the candidate network in response to the candidate network being included in the scan result.

Some embodiments also relate to a non-transitory computer-readable medium having instructions stored thereon that, when executed by a wireless device, causes the wireless device is configured to perform operations including determining a current location of the wireless device and generating an NBKN list based on at least one known network the wireless device has previously joined and on the current location of the wireless device. The operations may also include selecting a candidate network from the NBKN list based on a network score assigned to the candidate network. The operations may also include scanning a previously-used channel associated with the candidate network to generate a scan result and attempting to join the candidate network in response to the candidate network being included in the scan result.

This Summary is provided merely for purposes of illustrating some embodiments to provide an understanding of the subject matter described herein. Accordingly, the above-described features are merely examples and should not be construed to narrow the scope or spirit of the subject matter in this disclosure. Other features, aspects, and advantages of this disclosure will become apparent from the following Detailed Description, Figures, and Claims.

BRIEF DESCRIPTION OF THE DRAWINGS/FIGURES

Embodiments of the disclosure are described with reference to the accompanying drawings. In the drawings, generally, like reference numbers indicate identical or functionally similar elements. Additionally, generally, the left most digit(s) of a reference number identifies the drawing in which the reference number first appears.

Figure 3A:
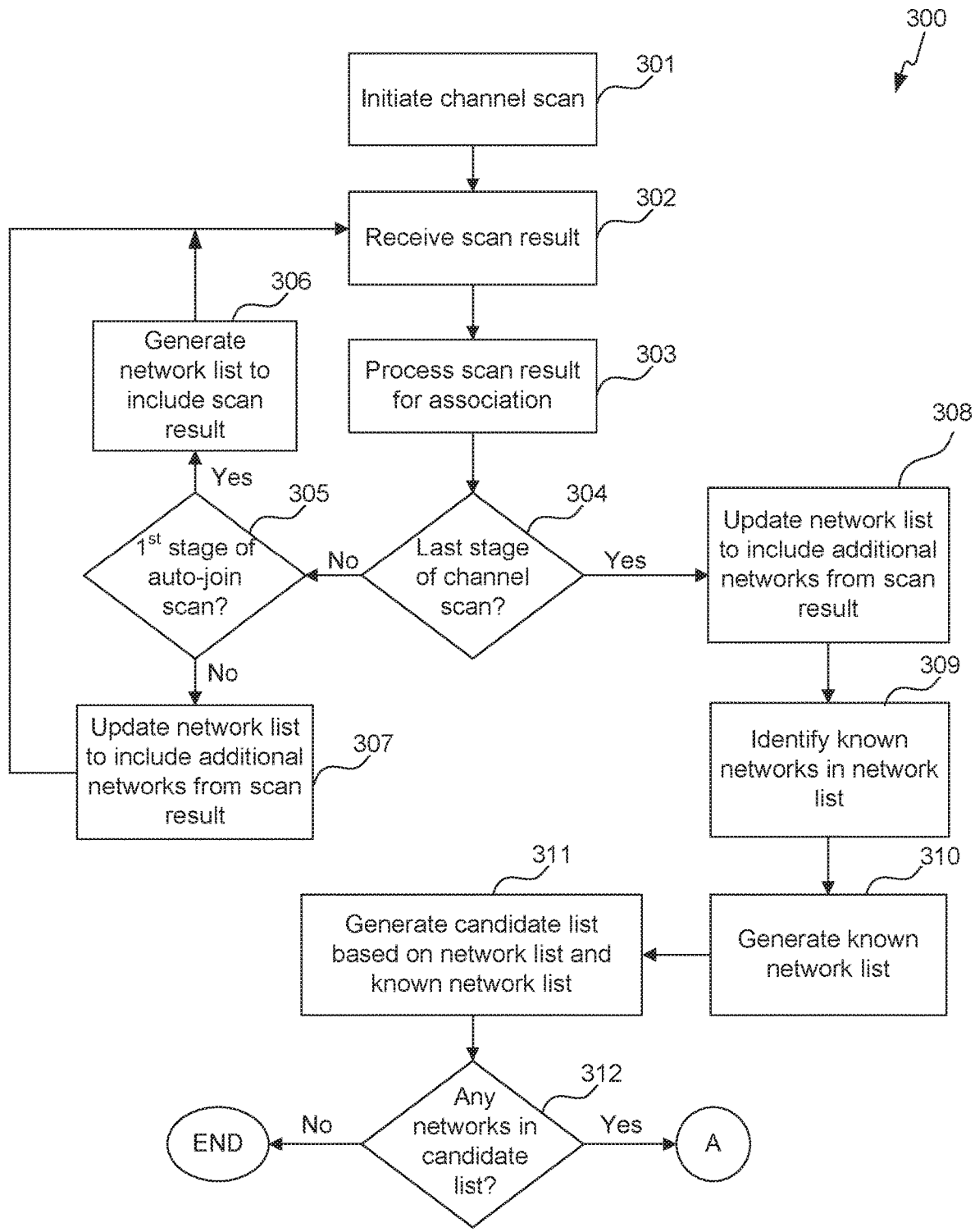
Figure 3B:
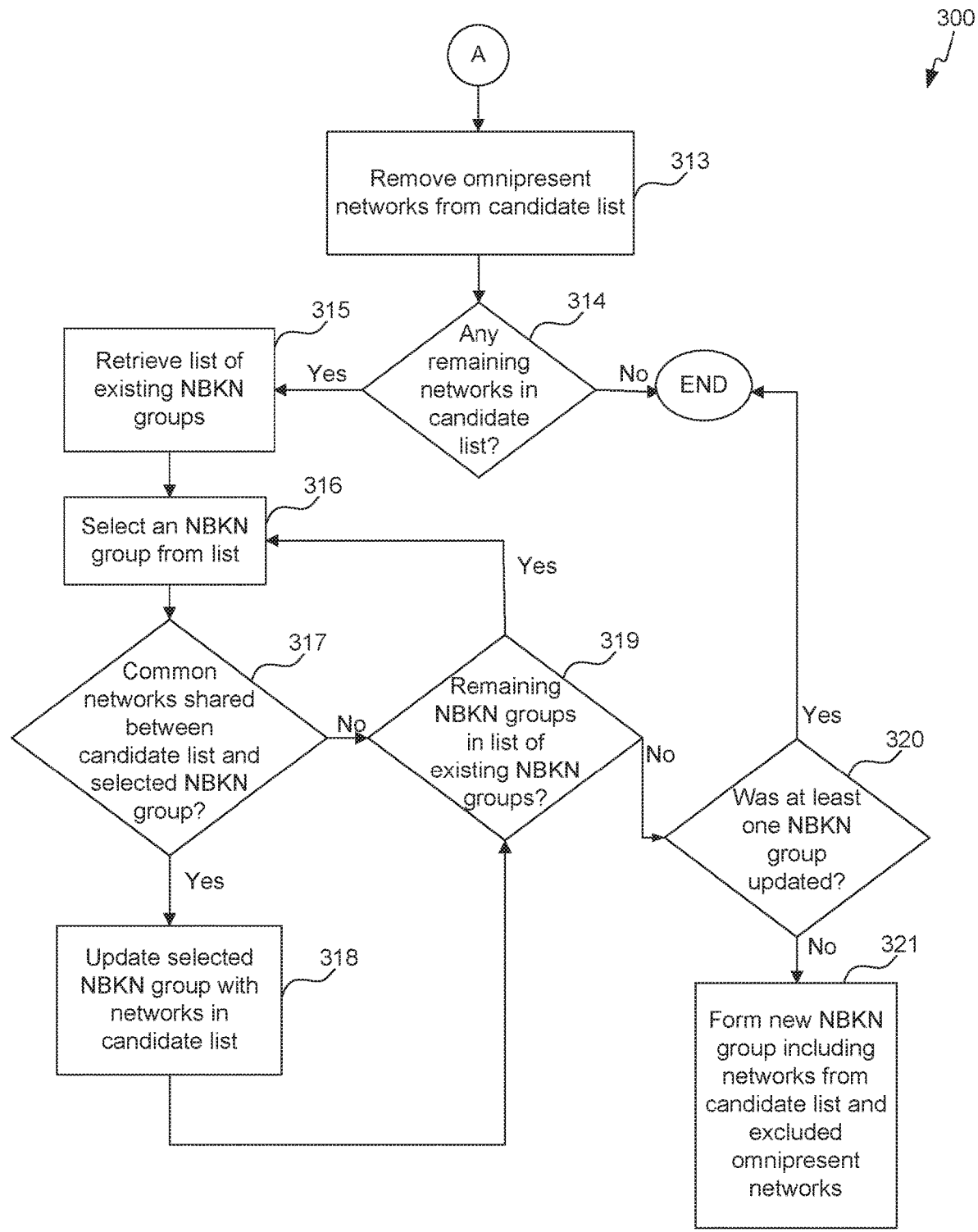

FIGS. 3A-B illustrate flowcharts of exemplary operations for performing detection of nearby known network (NBKN) groups, according to some embodiments.

Figure 4:
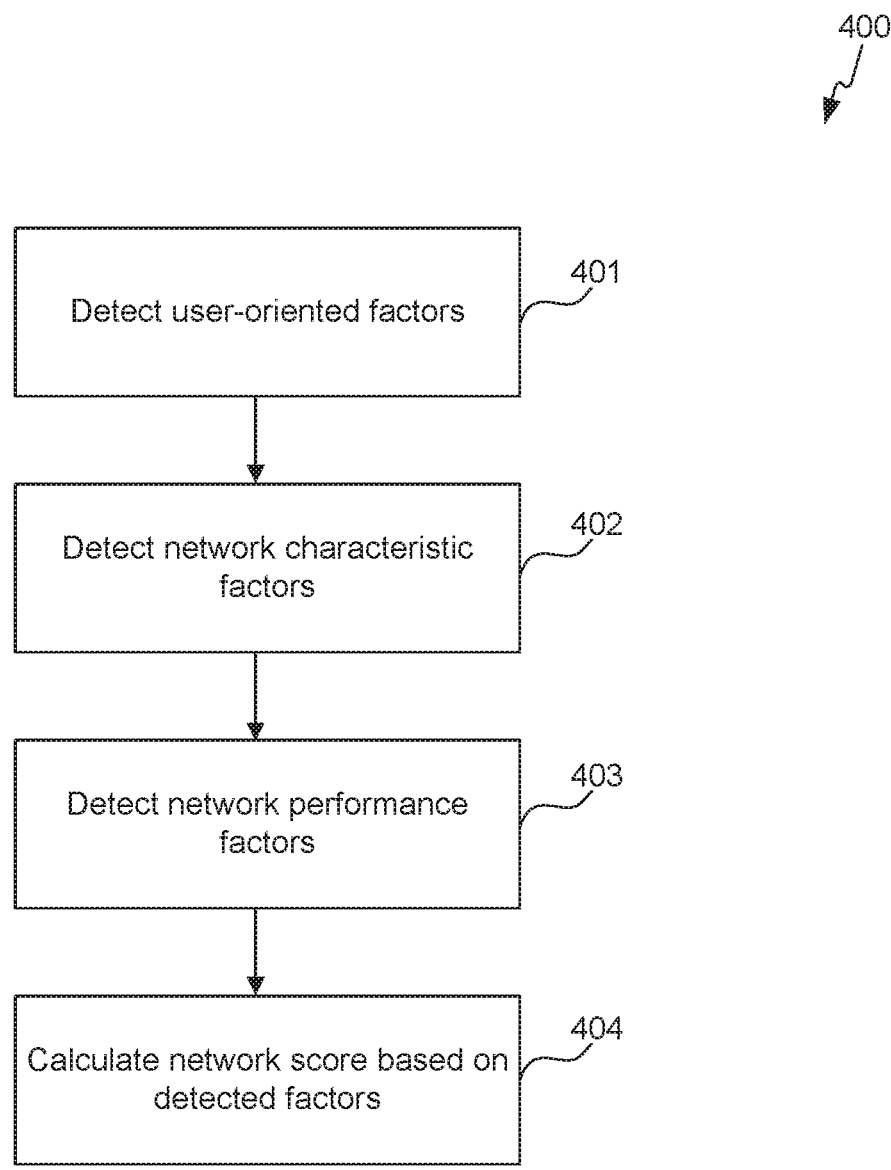

FIG. 4 illustrates a flowchart of exemplary operations for generating a network score for a known network, according to some embodiments.

Figure 5A:
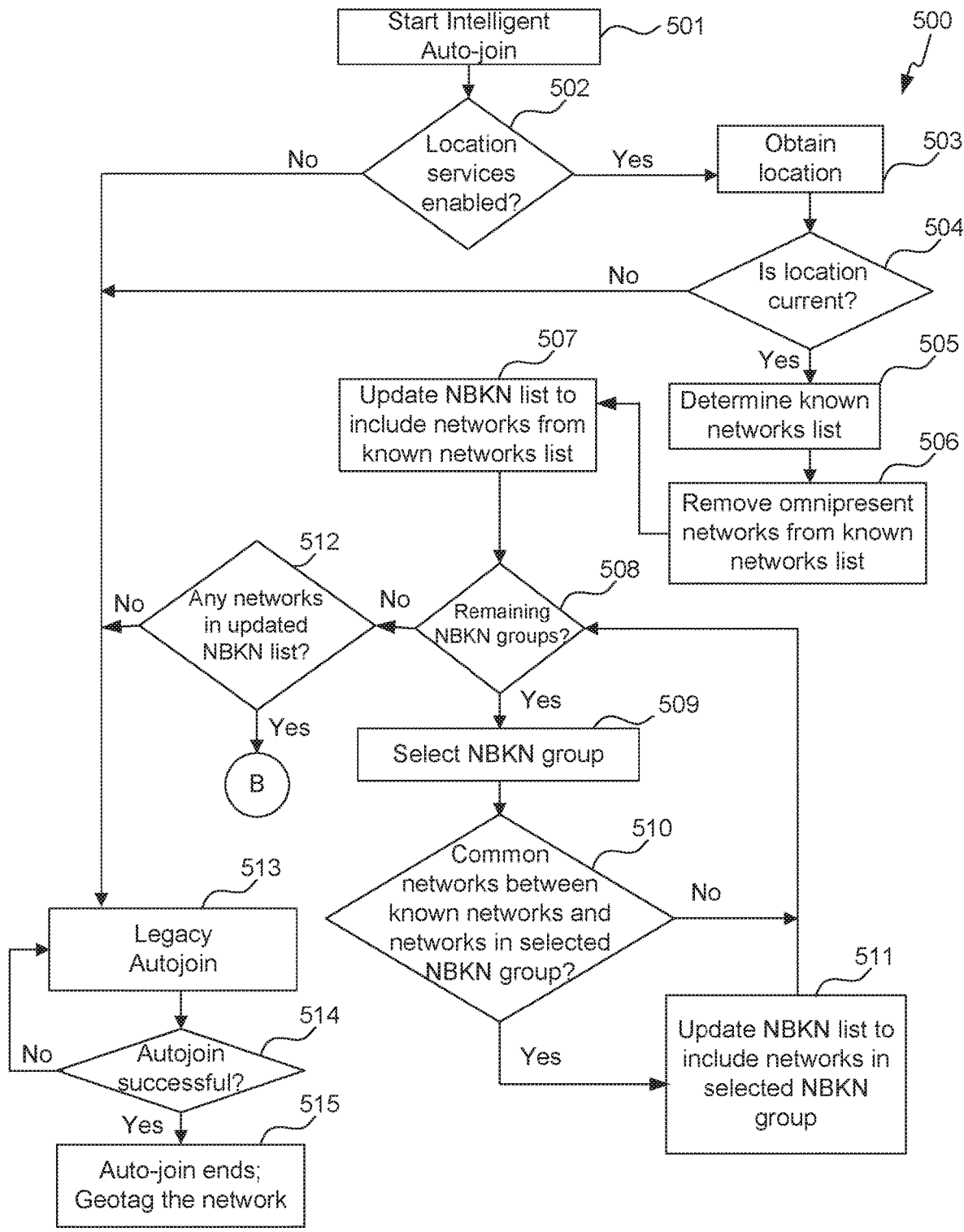
Figure 5B:
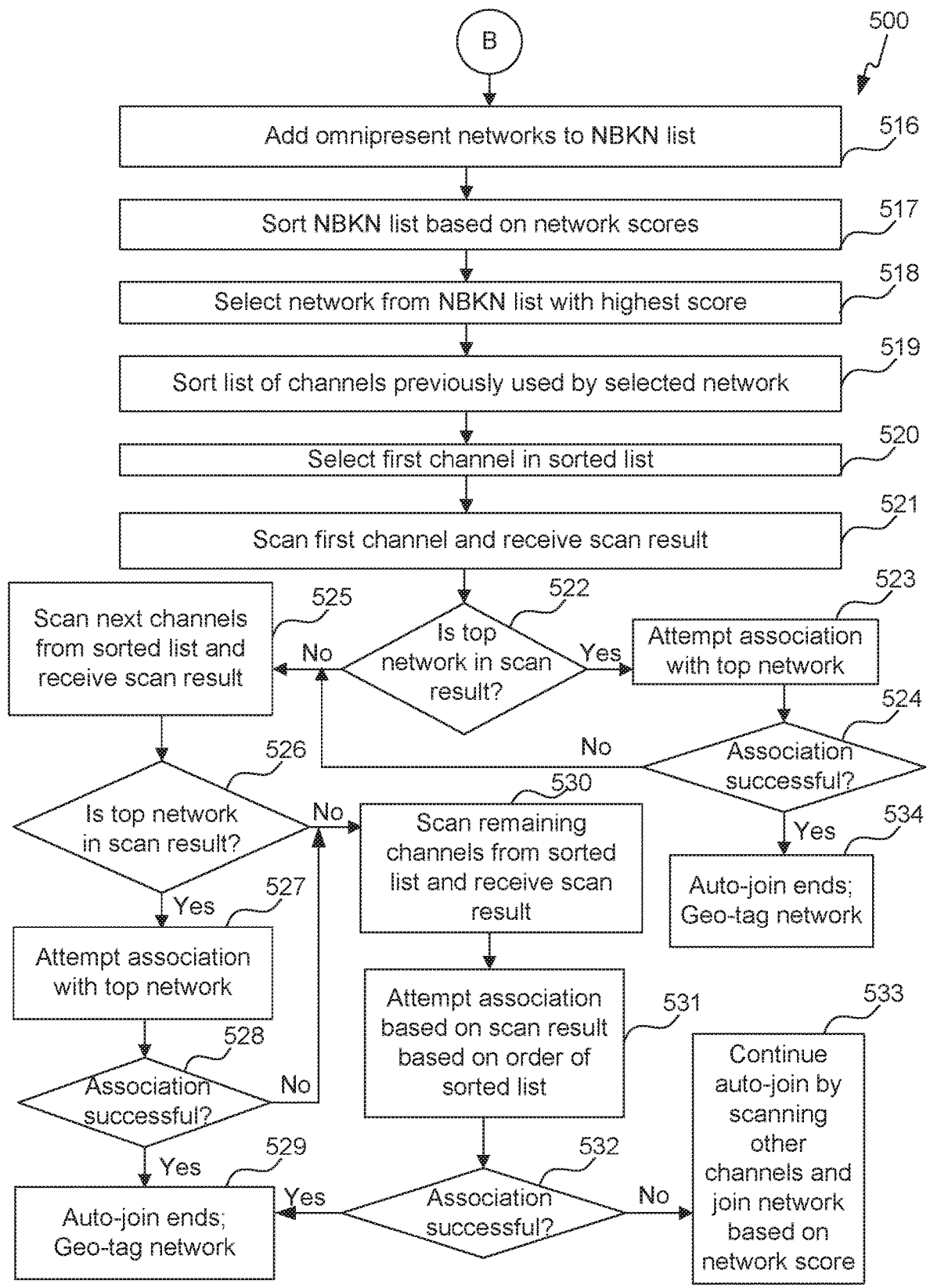

FIGS. 5A-5B illustrate flowcharts of exemplary operations for performing intelligent auto-join, according to some embodiments.

Figure 6A:
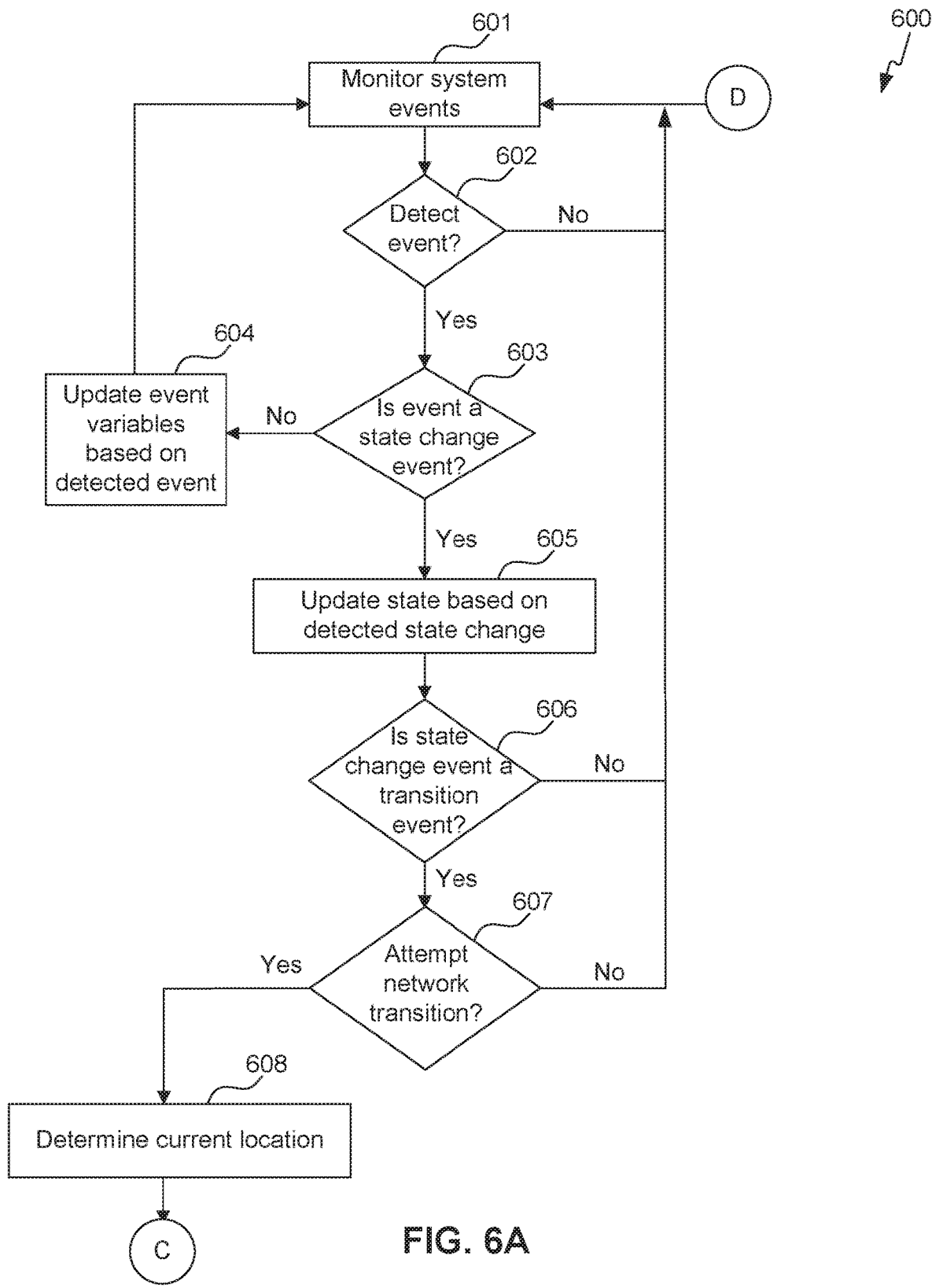
Figure 6B:
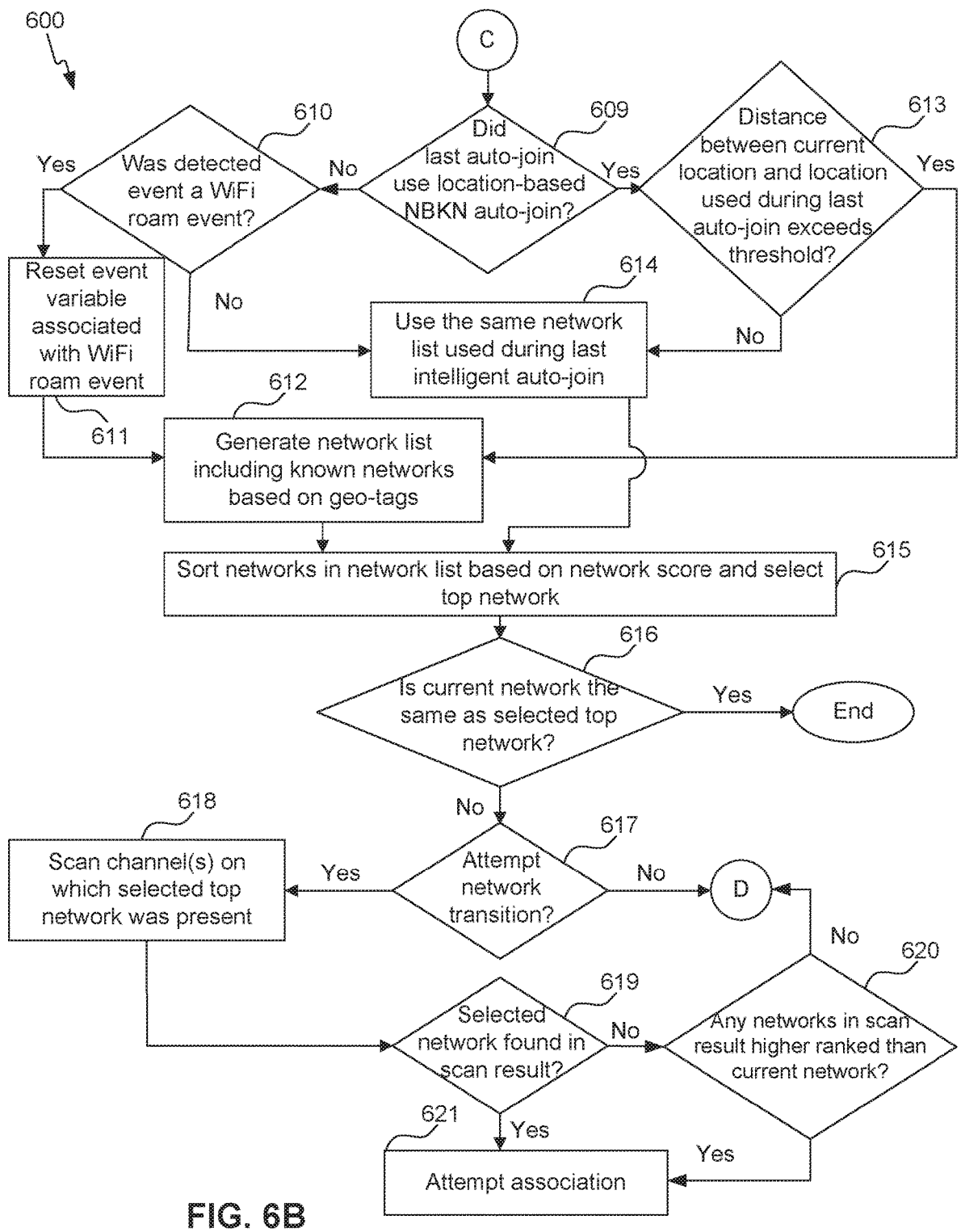

FIGS. 6A-6B illustrate a flowchart of exemplary operations for performing opportunistic network transitioning, according to some embodiments.

Figure 7:
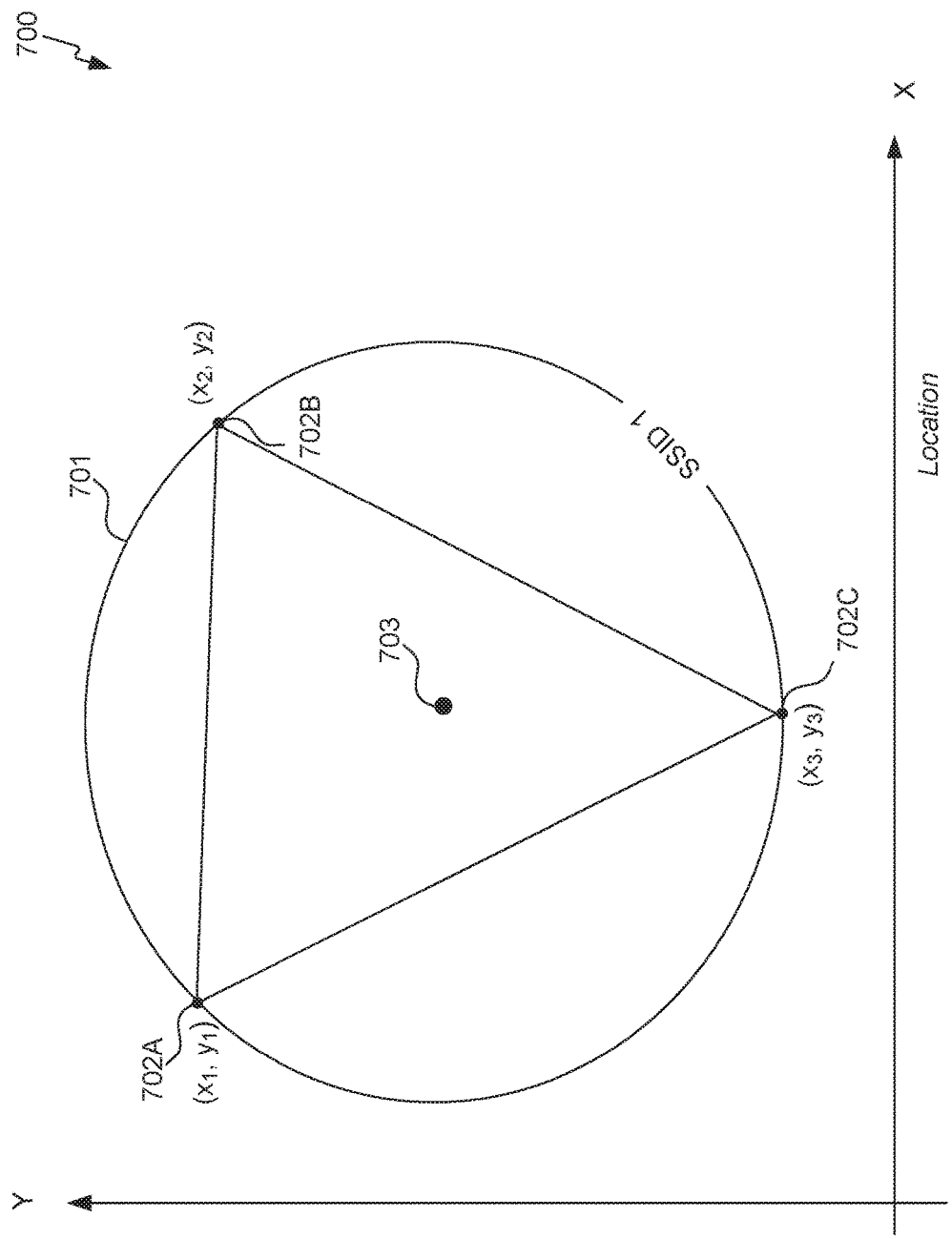

FIG. 7 illustrates a diagram of an example wireless communication environment for determining whether a network is an omnipresent network, according to some embodiments.

Figure 8:
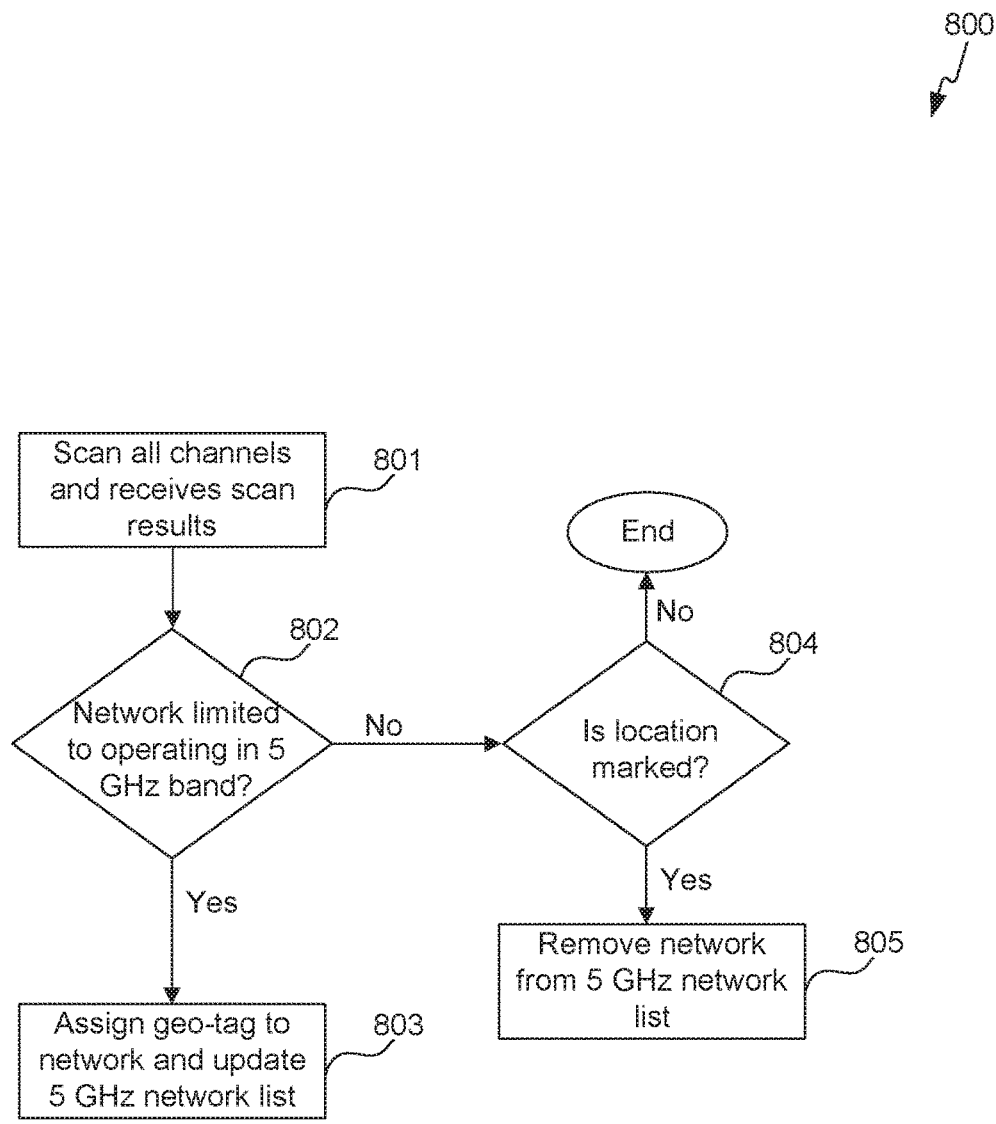

FIG. 8 illustrates a flowchart of exemplary operations for learning networks limited to 5 GHz operation, according to some embodiments.

Figure 9:
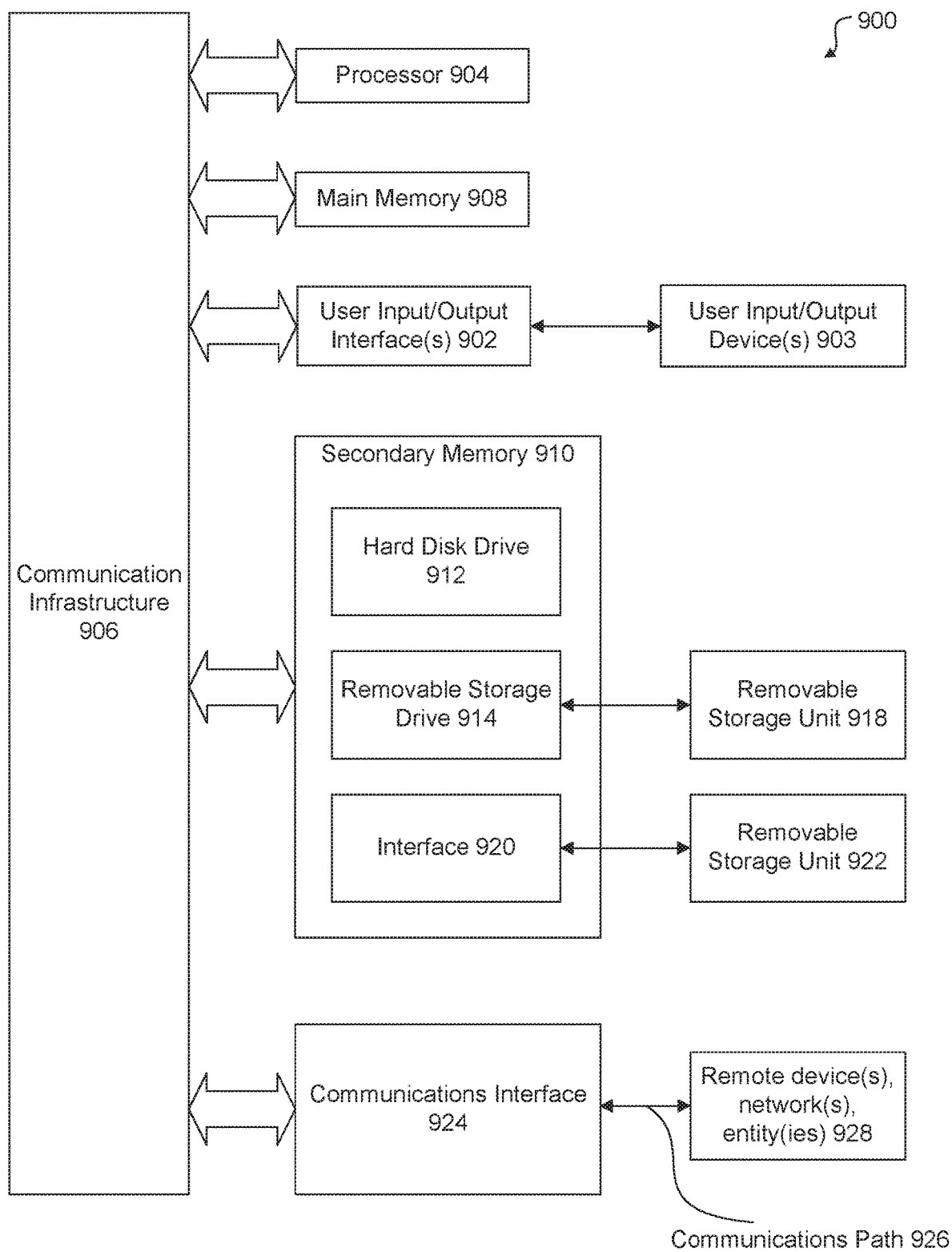

FIG. 9 illustrates a block diagram of an exemplary computer system, according to some embodiments.

DETAILED DESCRIPTION

If a wireless device has successfully joined a network, the wireless device remembers the network as a "known network." The wireless device may attempt to automatically join ("auto-join") the known network when it is in range of the network. In the present disclosure, known networks that are detected at a common (or the same) location by the wireless device are referred to as "nearby known networks (NBKNs)"; unknown and known networks that are detected at the common location by the wireless device are generally referred to as "co-located networks."

While a goal of auto-join techniques is to prioritize joining a network as fast as possible, improvements to auto-join techniques are needed to allow a wireless device to quickly connect to a preferred or highest-ranked network. For the purpose of this disclosure, networks may be ranked based on a network score that takes into consideration one or more of: a network's performance, a network's metrics, user history associated with the network, and network characteristics. The network score provides an objective measure to rank networks detected by the wireless device, according to some embodiments.

Exemplary Intelligent Auto-Join Environment

Figure 1A:
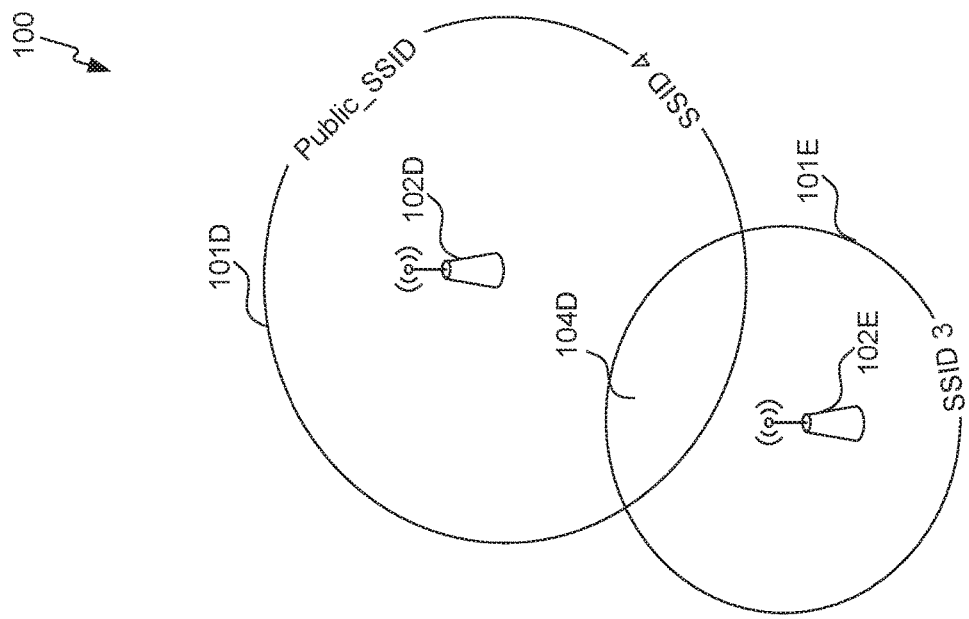
FIG. 1A illustrates a diagram of an exemplary wireless communication environment, according to some embodiments.
Figure 1A:
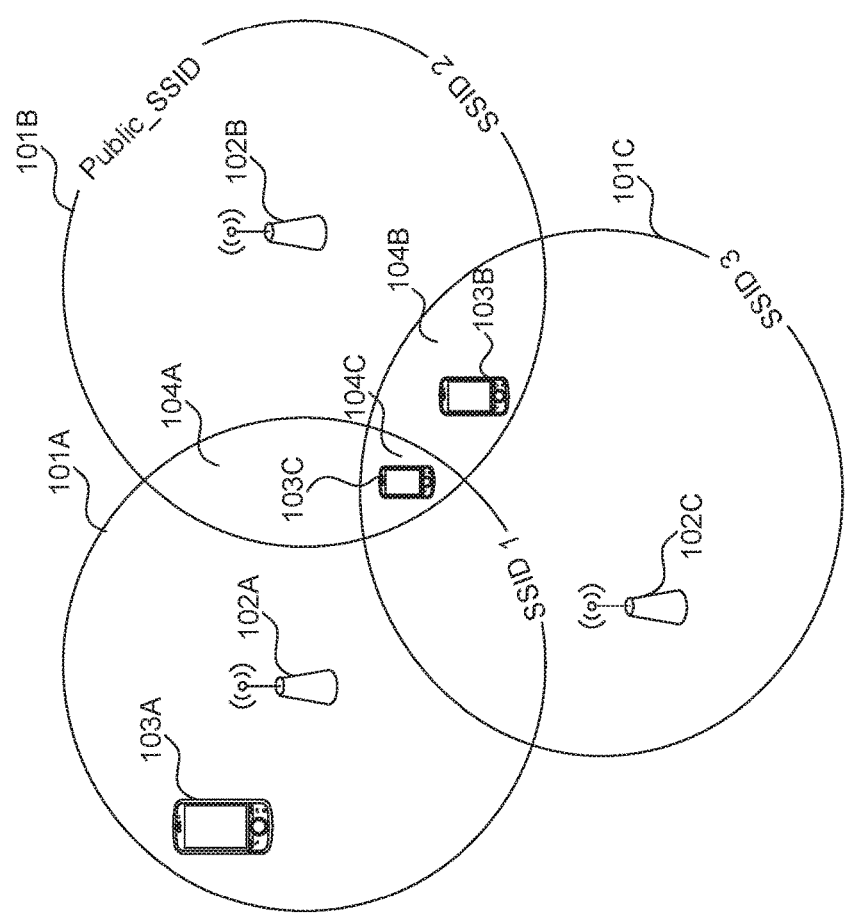

FIG. 1A illustrates a diagram of an exemplary wireless communication environment 100, according to some embodiments. Wireless communication environment 100 can include multiple wireless devices, such as wireless device 103A, wireless device 103B, and wireless device 103C, as well as multiple networking devices, such as access point 102A, access point 102B, access point 102C, access point 102D, and access point 102E. Access points 102A-E provide wireless devices 103A-C access to a network. Those skilled in the relevant art(s) will recognize that wireless devices 103A-C may be configured to communicate using any combination of Wi-Fi, Bluetooth, cellular, radio-frequency identification (RFID), near field communications (NFC), or the like. Additionally, any/all of wireless devices 103A-C may be implemented as a standalone device or as a discrete device. Alternatively, any/all of wireless devices 103A-C may be incorporated in or coupled to another electrical device or host device, such as a cellphone, smartwatch, portable computing device, a camera, a Global Positioning System (GPS) unit, a personal digital assistant, a video gaming device, a laptop, a desktop computer, a tablet, a computer peripheral (e.g., a printer or a portable audio and/or video player, a key fob, a household appliance, and/or any other suitable electronic device that will be apparent to those skilled in the relevant art(s) without departing from the spirit and scope of the present disclosure.

Access points 102A-E may be a component, or collection of components, that provide network access to wireless devices 103A-C. For example, access points 102A-102E may represent a Wi-Fi access point, a cellular base station (e.g., macrocell base station, a microcell base station, a femtocell base station), or a combination thereof. Access points 102A-E may be configured to broadcast a predetermined service set identifier (SSID) (or identifiers) associated with an IEEE 802.11 wireless network. For example, access point 102A may be configured to provide a network 101A associated with an "SSID 1" that provides network access to a certain area. Further, access point 102B may be configured to provide a network 101B associated with an "SSID 2" and a "Public_SSID," access point 102C may be configured to provide a network 101C associated with an "SSID 3," access point 102D may be configured to provide a network 101D associated with an "SSID 4" and a "Public_SSID," and access point 102E may be configured to provide a network 101E associated with an "SSID 5."

Networks 101A-E may include any type of wireless network such as, for example, public and private networks. Public wireless networks may include public Wi-Fi hotspots controlled by a network service provider. For example, service providers may configure routers to provide private networks to their customers within their homes and also provide public networks separate from the private networks. Accordingly, the routers can act as both a private hotspot for the customer within his home and as a public hotspot that is accessible to other customers of the network service provider outside of the home. In some embodiments, a router broadcasts two SSIDs: one for the private home network and one for the public hotspot. For example, access points 102B and 102C may be configured by a service provider to transmit an SSID associated with a private network, "SSID 2" and "SSID 4," as well as an SSID associated with a public network, "Public_SSID."

In some embodiments, access points controlled by the same service provider can broadcast the same SSID for a public hotspot. For example, access points 102B and 102D may be controlled by service provider A and may be configured to broadcast "Public_SSID" as an SSID. Accordingly, as wireless devices 103A-C roam, they may detect the same SSID (e.g., "Public_SSID") for the public hotspot at different locations. In this manner, wireless networks 101B and 101D accessed through a public hotspot may be considered omnipresent networks because the SSID is seen at more than one location (e.g., wireless network 101B and 101D).

Access points 102A-C can provide network access to wireless devices, such as wireless devices 103A-C that fall within the coverage area of networks 101A-C. Similarly, access points 102D-E can provide network access to wireless devices that fall within the coverage area of networks 101D-E. A wireless device located within a coverage area of a network can detect the presence of the network's access point by detecting the SSID broadcast by the access point. For example, wireless device 103A, which is located within network 101A, may conduct a channel scan and receive, as a scan result, the SSID 1 broadcast by access point 102A. Access points 102A-C may be configured to receive and transmit communications to wireless devices 103A-C within network 101A-C. The information exchanged between wireless devices 103A-C and access points 102A-C may represent any number of different signals types, including but not limited to scanning signals (e.g., "beacons"), command signals, information requests, and/or data packets.

In some embodiments, one or more wireless devices that detect networks with overlapping coverage may form a new nearby known network (NBKN) group or update an existing NBKN group to include any detected network. An NBKN group is a list that includes NBKNs detected by the one or more wireless devices at a certain physical location. In some embodiments, formation of the new NBKN group or an update to the existing NBKN group may depend on the scan result of a channel scan performed at the certain physical location. For example, a wireless device may form a new NBKN group when networks detected in a scan result are not found in an existing NBKN group. However, if there is at least one network within the scan result found in an existing NBKN group, the wireless device may update the existing NBKN group to include any other networks identified in the scan result. In some embodiments, each NBKN group includes at least one non-omnipresent network. Alternatively, in some embodiments, each NBKN group is limited to non-omnipresent networks and excludes omnipresent networks. Because an omnipresent network can be located in multiple locations and broadcast the same SSID, the omnipresent network can negatively impact the creation of NBKN groups by improperly associating networks located at different locations. For example, as previously discussed, an omnipresent network operated by a service provider near a user's home and office could cause the creation of a single NBKN group that includes the omnipresent network and any network detected at the user's home and office. Rather, the formation of two different NBKN groups (e.g., a home NBKN group and an office NBKN group) would be more appropriate. Accordingly, in some embodiments, omnipresent networks are not utilized when generating NBKN groups. Omnipresent networks are discussed in further detail below with respect to FIGS. 2 and 3A-3B.

Continuing the example above, wireless device 103A may generate an NBKN group that includes network 101A because network 101A is in a scan result of the channel scan performed by wireless device 103A at the certain location. Upon joining network 101A, wireless device 103A may assign a geo-tag to network 101A to associate network 101A with the certain location at which wireless device 103A auto-joined network 101A.

Wireless device 103B and wireless device 103C each may generate a new NBKN group or update an existing NBKN group in a similar manner as wireless device 103A. The NBKN groups generated by wireless devices 103B and 103C include additional networks that may be associated with their respective locations. When access point 102A is within a certain proximity of access point 102B, network 101A overlaps with network 101B resulting in an overlapping coverage area 104A. Within overlapping coverage area 104A, initiating a channel scan of available networks can result in a wireless device 103C detecting the SSIDs broadcasted by access point 102A and access point 102B. Similarly, an overlapping coverage area 104B represents an overlap between network 101B and network 101C, where initiating a channel of available networks can result in a wireless device 103B detecting the SSIDs broadcasted by both access point 102B and access point 102C. For example, wireless device 103B can detect "SSID 2" and "SSID 3" broadcasted by access point 102B and access point 102C, respectively. Based on the detected SSIDs, wireless device 103B may generate or update an NBKN group that includes network 101B and 101C.

In some embodiments, access points 102A-C may be situated such that networks 101A-C overlap at an overlapping coverage area 104C, where initiating a channel scan can result in wireless device 103C detecting the SSIDs broadcasted by access points 102A-C. For example, wireless device 103C can detect "SSID 1," "SSID 2," and "SSID 3" broadcasted by access point 102A, access point 102B, and access point 102C, respectively. Based on the detected SSIDs, wireless device 103C may generate or update an NBKN group that includes network 101A, network 101B, and network 101C. Similarly, access points 102D-E may be situated such that networks 101D-E coincide at an overlapping coverage area 104D.

For explanation and example purposes, networks 101A-101E are discussed with respect to wireless device 103C. The present disclosure is not so limited. Instead, networks 101A-101E disclosed herein may support communications with one or more other wireless devices, such as wireless device 103A and/or wireless device 103B. As an illustrative example, network 101A may represent a private home network for wireless device 103C, network 101B may represent a public or omnipresent network (e.g., controlled by a service provider), network 101C may represent a neighbor's private network, network 101D may represent a public or omnipresent network, and network 101E may represent a private office network.

When located in overlapping coverage area 104C, wireless device 103C may perform a channel scan and may receive a scan result that includes the SSIDs for networks 101A-C. Wireless device 103C may (i) form a new NBKN group if none of the SSIDs of networks 101A-C are present in an existing NBKN group or (ii) if at least one of the SSIDs of networks 101A-C is present in an existing NBKN group, update the existing NBKN group to include the other SSIDs. In this example, either the new NBKN group or the updated existing NBKN group would include network 101A (e.g., a private home network), network 101B (e.g., an omnipresent network), and network 101C (e.g., neighbor's private network).

If wireless device 103C roams to overlapping coverage area 104D, wireless device 103C may perform another channel scan and receive another scan result that includes the SSIDs for networks 101D-E. Wireless device 103C may (i) form another NBKN group if none of the SSIDs of networks 101D-E are present in an existing NBKN group or (ii) if at least one of the SSIDs of networks 101D-E is present in an existing NBKN group, update an existing NBKN group to include the other SSID. If the SSIDs of networks 101D-E are not present in any NBKN group, wireless device 103C may generate another NBKN group that would include wireless network 101D (e.g., the public network) and wireless network 101E (e.g., the private office network).

In some embodiments, NBKN groups generated by wireless device 103C are associated with locations of networks (within respective NBKN groups) at which wireless device 103C joined each network. In some embodiments, wireless device 103C assigns a geo-tag to each network that it has successfully joined. The geo-tag may represent location coordinates at which wireless device 103C joins the network.

Figure 1B:
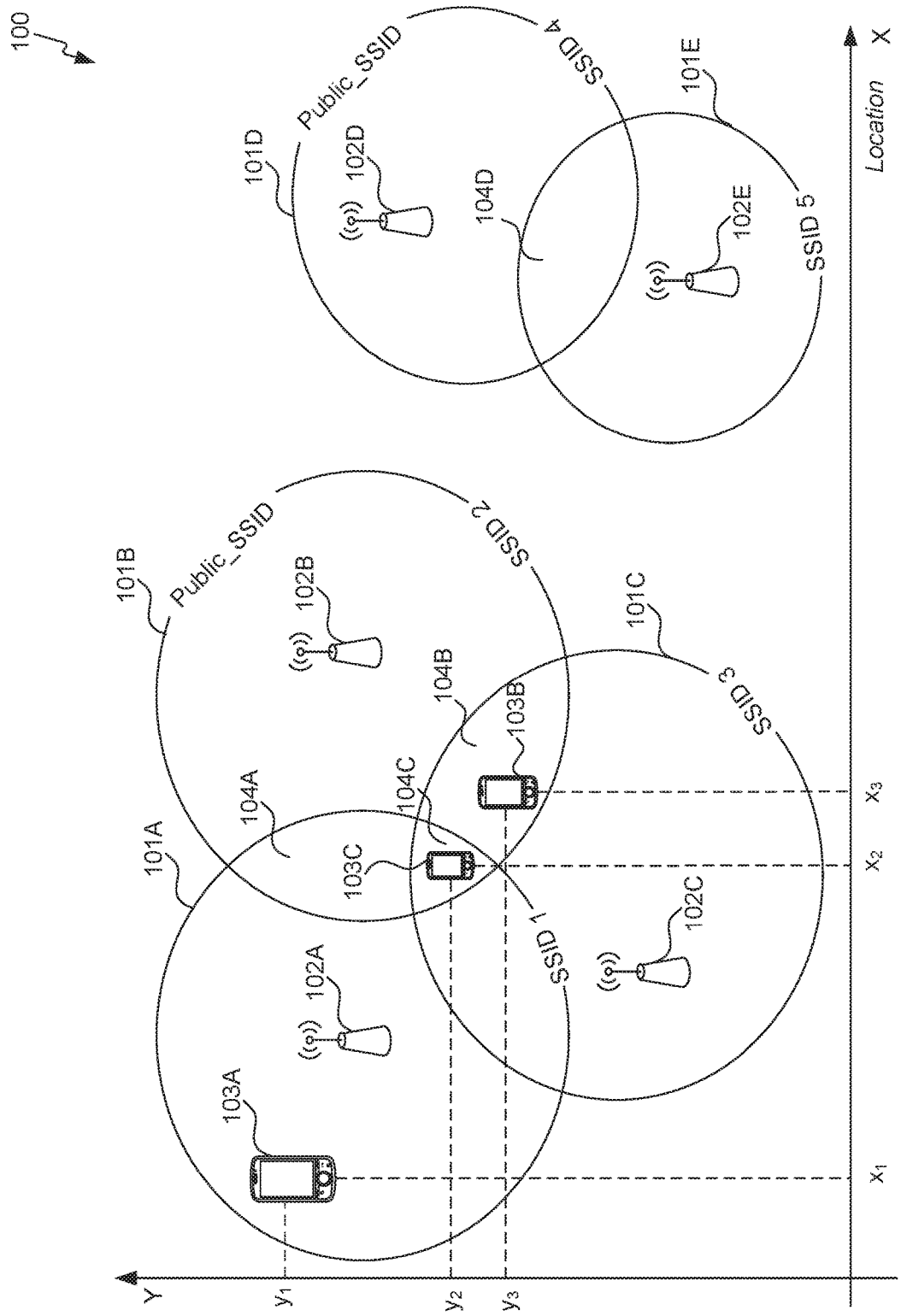
FIG. 1B illustrates a diagram of an exemplary wireless communication environment that incorporates geo-tag information according to some embodiments.

FIG. 1B illustrates a diagram of an exemplary wireless communication environment that incorporates geo-tag information, according to some embodiments. Wireless device 103A may receive a trigger to attempt to auto-join a network based on its current location, according to some embodiments. During the auto-join process, wireless device 103A discovers an NBKN group (or a set of NBKNs) based on the current location and attempts to connect to a network within the NBKN group with the highest preference. The NBKN group can include one or more networks that wireless device 103A may attempt to join based on the current location of wireless device 103A. The creation of the NBKN group is discussed in further detail below with respect to FIGS. 3A-3B.

In referring to FIG. 1B, wireless device 103A determines its location. For example, wireless device 103A may determine its location by enabling a location services application stored thereon. If the location services application is not enabled, wireless device 103A may perform a legacy procedure for auto-joining network 101A. Upon joining network 101A, wireless device 103A may retrieve its current location (e.g., either actively such as by activating location detection components of wireless device 103A or passively such as by retrieving available location information previously requested by other applications of wireless device 103A) and assign a geo-tag to network 101A. For example, with regard to network 101A, wireless device 103A may assign a geo-tag of $(x_1, y_1)$ and wireless device 103C may assign another geo-tag of $(x_2, y_2)$. In other examples, either or both of wireless devices 103A and 103C can assign a geo-tag reflecting a reported or estimated position of access point 102A. In some embodiments, wireless devices 103A and 103C may assign geo-tags to network 101A upon successfully connecting to network 101A. In some embodiments, wireless devices 103A and 103C may assign geo-tags to network 101A when network 101A is returned in a scan result of a channel scan.

In some embodiments, networks may be assigned a predetermined number of geo-tags for each channel band of the network. For example, a network having a 2.4 GHz channel band and a 5 GHz channel band may be assigned a maximum number of geo-tags for each channel. The maximum number of geo-tags may be defined by a manufacturer of the wireless device. The wireless device can store a geo-tag for each NBKN. In some embodiments, the wireless device can update the geo-tag of a network that the wireless device has successfully joined. In some embodiments, geo-tags are dated so that the wireless device can track age information of the geo-tags. For example, geo-tags older than a predetermined period of time (e.g., days, weeks, months, etc.) can be discarded.

Wireless device 103A may utilize any method for determining its location, including through global positioning system (GPS) features of wireless device 103A, through information obtained through beacons transmitted by access points, through information obtained through cell towers, and/or through leeched location information (e.g., previously stored on wireless device 103A prior to an initiation of intelligent auto-join). A leeched location refers to location information that is available on wireless device 103A (e.g., previously obtained by another application or process running on wireless device 103A). The leeched location can be accessed without re-activating location components in wireless device 103A to obtain a location of wireless device 103A, thus reducing power consumption in wireless device 103A. For example, wireless device 103A may have applications and system features of an operating system (e.g., a daemon) that frequently and/or periodically request the device's location. In some embodiments, intelligent auto-join includes monitoring the location requests and storing the associated location information. Intelligent auto-join may use this leeched location information as part of intelligent-auto-join.

In some embodiments, when relying on leeched location information, intelligent auto-join may verify whether the leeched location information is valid. For example, intelligent auto-join may determine that the leeched location information is current (e.g., the leeched location information has been updated within a threshold time period). Additionally or alternatively, a confidence measure of the leeched location information can be determined based on metadata associated with the leeched location information. For example, the metadata may specify an estimated degree of accuracy associated with the leeched location information, such as in terms of a radius or range from a location (e.g., 25 meters) at which the device is determined to be at the time the leeched location information was originally obtained. Accordingly, if the leeched location is current and/or a confidence measure (e.g., accuracy) of the leeched location information is within a threshold value (e.g., within meters, tens of meters, etc.), wireless device 103A may use the leeched location information as the device's location for the auto-join procedure. In some embodiments, wireless device 103A may require greater location accuracy than may be provided by leeched location information. Accordingly, if the leeched location information is not sufficiently current and/or if the confidence measure associated with the leeched location information does not satisfy the threshold value, the wireless device may determine its current location through any other means such as, for example, Wi-Fi signals, cellular signals, and/or GPS signals.

Wireless device 103A may retrieve an NBKN group based on the determined location. The NBKN group may include one or more NBKNs depending whether multiple NBKNs are associated with the determined location. For example, wireless device 103A may identify any NBKNs that have geo-tags within a predetermined distance to the determined location of wireless device 103A. Referring back to FIG. 1A, a current location of wireless device 103A may be associated with an NBKN group that includes network 101A, network 101B, and network 101C. However, at its current location, wireless device 103A may only be in range of network 101A, while network 101B and network 101C are out of range. Alternatively, a received signal strength indicator ("RSSI") of network 101A may be higher at the current location of wireless device 103A compared to the respective RSSIs of network 101B and network 101C.

Once an NBKN group is retrieved, wireless device 103A selects a network from the NBKN group with the highest assigned network score (e.g., the highest-ranked network of the NBKN group). For example, network 101A can have the highest assigned network score in the NBKN group based on its associated RSSI at the current location of wireless device 103A. Based on network 10A's network score, wireless device 103A can identify network 101A as a candidate network and attempt to connect to access point 102A. Additional details on network scores are described below with respect to FIG. 4.

After selecting network 101A from the NBKN group, wireless device 103A connects to network 101A using a multi-stage process for auto-joining network 101A, according to some embodiments. Wireless device 103A may store a list of channels previously used to connect to network 101A. In some embodiments, the list includes a predetermined number of previously-used channels. In a first stage of the multi-stage process for auto-joining network 101A, wireless device 103A may access the list of channels and attempt to scan a previously-used channel associated with network 101A. In a subsequent stage, if wireless device 103A cannot connect to network 101A, wireless device 103A may attempt to scan a predetermined number of the most recently used channels associated with network 101A. The most recently used channels may be retrieved from the stored list of channels. If wireless device 103A is still unsuccessful in connecting to network 101A, in yet another subsequent stage, wireless device 103A may scan any remaining channels from the list of channels associated with the network 101A. Upon successfully connecting to network 101A through access point 102A, wireless device 103A assigns a geo-tag to network 101A based on the previously determined location of wireless device 103A. In some embodiments, if wireless device 103A is unable to connect to network 101A after scanning through the list of channels, wireless device 103 can attempt to connect to another network in the NBKN group (e.g., a network with the next highest network score).

In referring to FIG. 1A, wireless device 103B may be located at a location in overlapping coverage area 104B. In some embodiments, the current location of wireless device 103B may be associated with an NBKN group (or NBKN groups) that includes network 101A, network 101B, and network 101C. Wireless device 103B may determine a location while located within overlapping coverage area 104B using similar location techniques described above with respect to wireless device 103A. Wireless device 103B may identify an NBKN group (or NBKN groups) associated with the determined location of wireless device 103B, where the NBKN group includes network 101A, network 101B, and network 101C. Wireless device 103B may identify the highest-ranked network within the NBKN group as a first candidate network with which to attempt to connect. For example, wireless device 103B may be in range of network 101B and network 101C. Based on one or more factors, network 101B may have a higher rank (e.g., a higher network score) than network 101C. Accordingly, wireless device 103B may first attempt to connect to network 101B employing the multi-stage approach discussed above with respect to wireless device 103A. If successfully connected, wireless device 103B assigns a geo-tag to network 101B. If unsuccessful, wireless device 103B may proceed to auto-join the next ranked network in the NBKN group of network 101B. For example, network 101C may have the next highest score.

Wireless device 103C is located in overlapping coverage area 104C. In some embodiments, the current location of wireless device 103C may be associated with an NBKN group (or NBKN groups) that includes network 101A, network 101B, and network 101C. As an example, wireless device 103C retrieves a location while located within overlapping coverage area 104C using similar location techniques described above with respect to wireless device 103A. Wireless device 103C may identify an NBKN group (or NBKN groups) associated with the determined location of wireless device 103C within overlapping coverage area 104C. Wireless device 103C may also identify the highest-ranked network within the NBKN group as a first candidate network with which to attempt to connect. For example, based on one or more factors, network 101A may have a higher rank (e.g., a higher network score) than network 101B and network 101C. Accordingly, wireless device 103C will first attempt to connect to network 101A employing the multi-stage approach discussed above with respect to wireless device 103A. If successfully connected, wireless device 103C assigns a geo-tag to network 101A. If unsuccessful, wireless device 103C may attempt to auto-join any remaining networks in the NBKN in order of a ranking. For example, wireless device 103C may auto-join the next ranked network in the NBKN group of network 101A: either network 101B or network 101C.

The foregoing discussion is provided for illustrative purposes, and this disclosure is not limited to those examples. When the disclosed techniques for intelligent auto-join are applied to the wireless communication context—illustrated by wireless communication environment 100, for example—then wireless devices 103A-C may be capable of performing intelligent auto-join to connect to a preferred network (e.g., a network with the highest network score).

Figure 2:
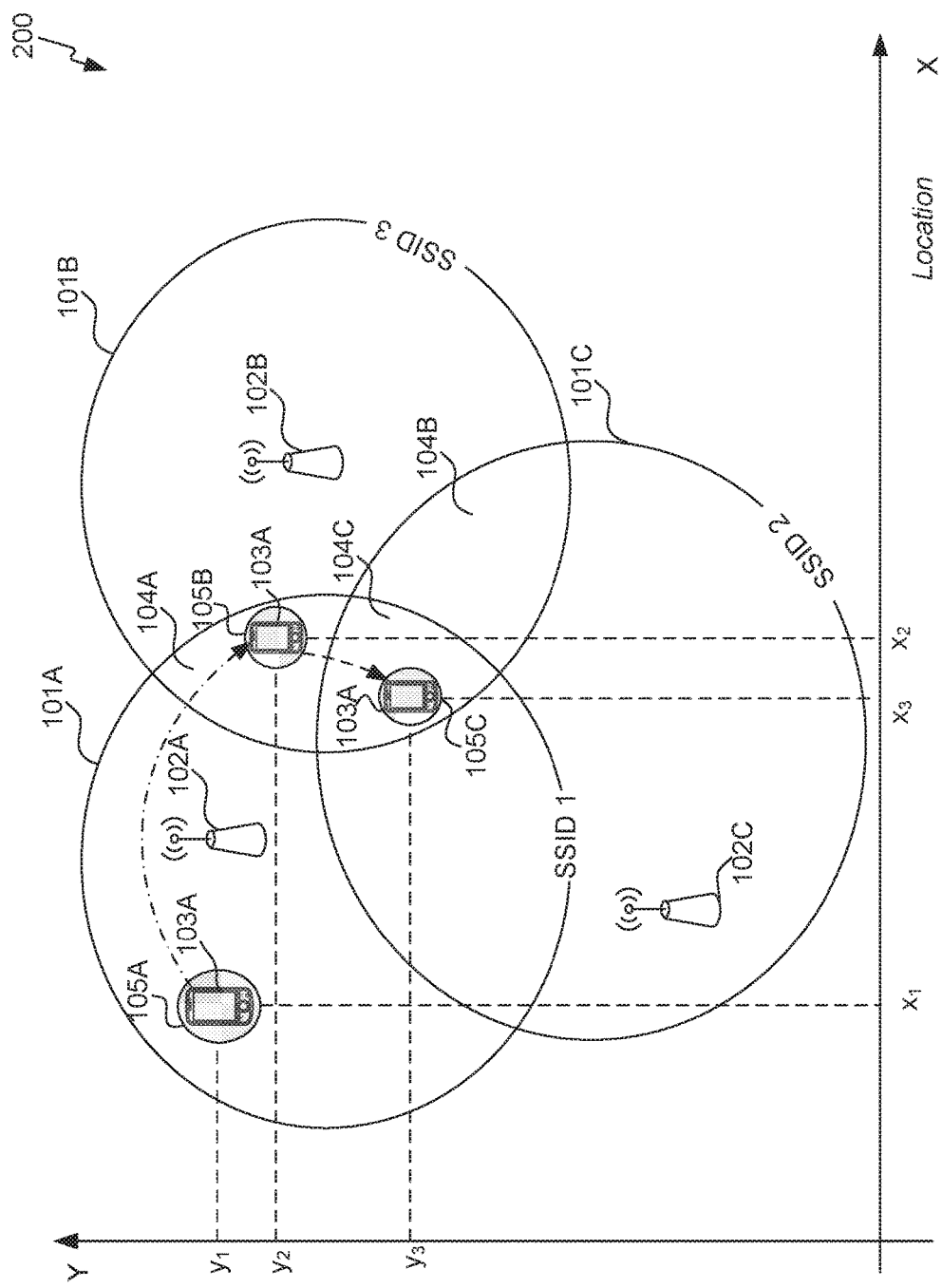
FIG. 2 illustrates a diagram of a second exemplary wireless communication environment supporting a roaming wireless device, according to some embodiments.

FIG. 2 illustrates a diagram of an exemplary wireless communication environment 200 supporting wireless device 103A that is roaming between network 101A, network 101B, and network 101C, according to some embodiments. Additional aspects of intelligent auto-join will be described with respect to FIG. 2 such as, for example, opportunistic transitioning between networks. For explanation purposes, the techniques for intelligent auto-join are discussed with respect to wireless device 103A. The present disclosure is not so limited. The techniques for intelligent auto-join disclosed herein may be used to connect a wireless device, such as wireless device 103B and wireless device 103C, to multiple wireless networks and opportunistically transition between such networks. Moreover, an extensive discussion of the operational features that overlap between wireless device 103A in FIG. 1A will be omitted from the discussion here. Instead, reference will be made to the similar operational features discussed with reference to FIG. 1A, and the corresponding discussion from FIG. 1A will apply equally to the discussion of the elements in FIG. 2.

In some embodiments, wireless device 103A stores an NBKN group, "NBKN 1," that includes networks 101A-101C with network 101C having the highest network score, followed by network 101B, and network 101A having the lowest network score. Wireless device 103A may receive a trigger while at location 105A (within a coverage area of network 101A) which may be stored in wireless device 103A as coordinates $(x_1, y_1)$. The trigger may be any event that causes wireless device 103A to initiate a process of intelligent auto-join to connect to a wireless network. Prior to receiving the trigger, wireless device 103A is not connected to a network. Examples of a trigger include, but are not limited to, wireless device 103A receiving a command or instruction (e.g., from a user that initiates Wi-Fi selection through a setting on wireless device 103A), a command or instruction from an application installed in wireless device 103A, and a communication received from access point 102A.

Upon receiving the trigger, wireless device 103A may initiate the intelligent auto-join process. Wireless device 103A may perform a channel scan and may retrieve a scan result associated with location 105A. As discussed above, wireless device 103A may determine its current location through any method including, but not limited to, GPS coordinates, beacon messages from access points 102A-102C, and/or obtaining leeched location information. The scan result includes networks detected at location 105A. In some embodiments, the scan result includes network 101A. Wireless device 103A may assign geo-tags to a network in the scan results based on the current location.

Based on the scan result, wireless device 103A may determine whether an existing NBKN group (or NBKN groups) includes network 101A. For example, wireless device 103A may determine that network 101A is already associated with NBKN 1, which also includes network 101B and network 101C. Wireless device 103A may employ the multi-stage process for auto-joining the highest-ranked network in NBKN 1. However, even if network 101B and/or network 101C may have higher network scores than network 101A, the coverage of those networks does not extend to location 105A. In some embodiments, as part of intelligent auto-join, wireless device 103A may exclude network 101B and network 101C because these networks are located beyond a predetermined distance from the current location of wireless device 103A. Accordingly, wireless device 103A may connect to network 101A. Alternatively, wireless device 103A—which may be aware that networks 101B and network 101C are nearby (based on their inclusion in the same NBKN group) and aware that networks 101B and network 101C have higher scores than network 101A—may delay its connection to network 101A. For example, wireless device 103A may decide to wait until it is in range of either or both of networks 101B and 101C prior to making a network connection. In some embodiments, wireless device 103A decides to join a particular network based on network scores associated with networks 101A, 101B, and 101C. For example, network 101A may have a score below a predetermined threshold, or the difference in network scores between network 101A and either or both of networks 101B and 101C may exceed a predetermined amount. In some embodiments, if wireless device 103A decides to connect to network 101A, wireless device 103A may assign a geo-tag corresponding to location 105A by, for example, associating coordinates $(x_1, y_1)$ with network 101A and storing the coordinates in memory.

After connecting to network 101A, wireless device 103A may roam to location 105B, which may be stored in wireless device 103A as coordinates $(x_2, y_2)$. Location 105B is located within overlapping coverage area 104A that includes coverage from network 101A and network 101B. While at location 105B (and connected to network 101A), wireless device 103A can determine whether to opportunistically transition to a higher-ranked network available at location 105B. This determination includes monitoring system events of wireless device 103A. Wireless device 103A may transition to another network based on the determination. In some embodiments, opportunistic transitioning allows wireless device 103A to transition from a currently-joined network to another network that may be more preferred (e.g., a network with improved metrics such as performance, security, and user-defined network preferences) when such networks become available. Opportunistic transitioning is described in further detail below.

If wireless device 103A determines that a transition would be appropriate, wireless device 103A may retrieve a list of networks based on location 105B. In some embodiments, wireless device 103A utilizes the networks included in NBKN 1 and determines that network 101C has the highest network score in NBKN 1. Accordingly, wireless device 103A may attempt to connect to network 101C. However, since location 105B may not be in range of network 101C, wireless device 103A attempts to connect to the network with the next highest network score in NBKN 1, network 101B. Upon successfully disassociating from network 101A and joining network 101B, wireless device 103A may assign a geo-tag corresponding to location 105B by, for example, associating coordinates $(x_2, y_2)$ with network 101B and storing the coordinates and an identification of network 101B in memory.

Alternatively, if wireless device 103A decides not to connect to network 101A, wireless device 103A—which is aware that network 101C is nearby (based on the network's inclusion in the same NBKN group) and that network 101C has a higher score than network 101B—may delay connection to or choose not to connect to networks 101A and 101B even though these may be the only networks presently in range. Wireless device 103A may decide to wait until it is in range of network 101C before attempting to connect.

After connecting to network 101B, wireless device 103A may roam to a different location 105C, which may be stored in wireless device 103A as coordinates $(x_3, y_3)$. Location 105C is located within overlapping coverage area 104C that includes coverage from networks 101A, 101B, and 101C. While at location 105C (and connected to network 101B), wireless device 103A may determine whether to opportunistically transition to a higher-ranked network available at location 105C. If wireless device 103A determines that a transition would be appropriate, wireless device 103A retrieves a list of networks based on location 105C. In some embodiments, wireless device 103A utilizes the networks included in NBKN 1 and determines that network 101C has the highest network score in NBKN 1. Accordingly, wireless device 103A may attempt to connect to network 101C. Upon successfully disassociating from network 101B and joining network 101C, wireless device 103A may assign a geo-tag corresponding to location 105C, for example, associating coordinates $(x_3, y_3)$ with network 101C and storing the coordinates in memory.

Exemplary Operations of Intelligent Auto-Join

Several features of intelligent auto-join will be discussed below with respect to FIGS. 3A-B, 4, 5A-B, 6A-6B, and 8. FIGS. 3A-B illustrate a method 300 of exemplary operations for performing detection of NBKN groups, according to some embodiments. FIG. 4 illustrates a method 400 of exemplary operations for generating a network score for a known network, according to some embodiments. FIGS. 5A-B illustrate a method 500 of exemplary operations for performing intelligent auto-join, according to some embodiments. FIGS. 6A-B illustrate a method 600 of exemplary operations for opportunistic transitioning from, for example, a lower-ranked NBKN to a higher-ranked NBKN, according to some embodiments. And FIG. 8 illustrates a method 800 of exemplary operations for learning networks limited to 5 GHz operation, according to some embodiments.

Referring to FIGS. 3A-B, method 300 includes exemplary operations for performing detection of nearby known network (NBKN) groups and forming new or updating existing NBKN groups, according to some embodiments. This disclosure is not limited to this operational description. Rather, it will be apparent to persons skilled in the relevant art(s) from the teachings herein that other operational control flows are within the spirit and scope of the present disclosure. It is to be appreciated that additional operations may be performed. Moreover, not all operations may be needed to perform the disclosure provided herein. Further, some of the operations may be performed simultaneously, or in a different order than shown in FIGS. 3A-B, as will be understood by a person of ordinary skill in the art. Some operations can be combined with operations of methods from other figures and/or performed as a single operation. In some implementations, one or more other operations may be performed in addition to or in place of the presently described operations. For illustrative purposes, method 300 is described with reference to the embodiments of FIG. 1A and wireless device 103C. However, method 300 is not limited to these embodiments.

Method 300 begins with 301, where wireless device 103C may initiate a channel scan. In some embodiments, wireless device 103C may initiate the channel scan upon receiving a trigger such as at the beginning of a procedure for intelligent auto join or upon initiation of a Wi-Fi detection application, by wireless device 103C, for detecting wireless networks. As described above, the channel scan can be initiated while wireless device 103C is located at a particular location, such as within overlapping coverage area 104C. In some embodiments, the channel scan is a full channel scan that includes scanning multiple Wi-Fi channels to detect available wireless networks.

In 302, wireless device 103C may receive a scan result based on the channel scan of 301. The scan result can include one or more networks associated with a current location of wireless device 103 that are detected during the channel scan.

In 303, wireless device 103C may process the scan result to determine the networks in the scan result. In some embodiments, the scan result includes metrics—such as, for example, RSSI, TCP success rate, whether the network supports 5 GHz, etc.—associated with each network. Wireless device 103C can update network scores for the networks in the scan result based on the metrics in the scan result as well as metrics detected by wireless device 103C.

In 304, wireless device 103C may determine whether a last stage of a channel scan has been reached. In some embodiments, the channel scan includes one or more stages for scanning channels. As an example, the channel scan can have three stages. In 304, wireless device 103C may determine whether the channel scan is at the last stage. If not, wireless device 103C may determine whether channel scan is at the first stage at 305. If so, at 306, wireless device 103C may generate a network list that includes the networks identified in the scan result provided in 302. If not, at 307, wireless device 103C may update the existing network list to include additional networks identified in the scan result provided in 302 that are not already present in the network list.

If wireless device 103C determines that the channel scan is at the last stage, in 308, wireless device 103C may update the network list to include additional networks identified in the scan result provided in 302 that are not already present in the network list. If the channel scan has one stage, then wireless device 103C generates a network list with the networks identified in the scan result. In 308, the network list at wireless device 103C includes the networks identified by the channel scan that was initiated at the current location of wireless device 103C. After 308, the network list includes both known and unknown networks with respect to wireless device 103C.

In 309, wireless device 103C may proceed to identify, based on the current location of wireless device 103C, known networks within the network list. In 310, wireless device 103C may generate a known network list that identifies networks to which wireless device 103C has previously connected or NBKNs.

In 311, wireless device 103C may generate a candidate list based on the network list and the known network list. In some embodiments, the candidate list may include the networks that are present in both the network list and the known network list. Accordingly, the candidate list identifies known networks that were identified during the channel scan in operations 301-309. It may also be possible that the candidate list does not include any networks (e.g., there are no networks that are found in both the network list and the known network list). In some embodiments, the networks identified in the candidate list are known networks and are associated with the current location of wireless device 103C.

In 312, wireless device 103C may determine whether there is at least one network in the candidate list. If not, method 300 ends because there are no known networks detected at the current location of wireless device 103C. But, if the candidate list includes at least one network, then wireless device 103C proceeds to 313.

FIG. 3B illustrates an extension of method 300 discussed with respect to FIG. 3A. In 313, wireless device 103C removes omnipresent networks from the candidate list. Removing omnipresent networks improves the creation of NBKN groups, according to some embodiments. Because an omnipresent network can be located in multiple locations and can broadcast the same SSID at each location, an NBKN group that includes the omnipresent network may be inaccurate—e.g., the NBKN group may include a network that is not within proximity of wireless device 103C.

In 314, wireless device 103C may determine whether there is at least one network in the candidate list. If not, method 300 ends because no networks are in the candidate list. If there is at least one network remaining in the candidate list, wireless device 103C knows that one or more of the networks are non-omnipresent (e.g., known networks) and are associated with the current location of wireless device 103C.

In 315, wireless device 103C may retrieve a list of existing NBKN groups to determine whether one or more existing NBKN groups include one or more networks in the candidate list. In 316, wireless device 103C may select an existing NBKN group from the list of existing NBKN groups.

In 317, wireless device 103C may determine whether there is at least one common network between networks in the candidate list and networks in the selected NBKN group. If yes, in 318, wireless device 103C may add the one or more networks from the candidate list to the selected NBKN group. In 319, if there are no networks in common or after updating the selected NBKN group in 318, wireless device 103C may determine whether there are remaining NBKN groups from the list of existing NBKN groups to select. If yes, wireless device 103C may select another existing NBKN group at 316 and repeats operations 317-319. If not, in 320, wireless device 103C may determine whether at least one NBKN group was updated with networks from the candidate list. If so, method 300 ends. If not, then networks in the candidate list do not belong to an existing NBKN group. Accordingly, in 321, wireless device 103C may form a new NBKN group that includes the networks in the candidate list as well as omnipresent networks that may have been removed in 313. The new NBKN group may therefore include both non-omnipresent and omnipresent networks that are known to wireless device 103C and that are associated with the current location of wireless device 103C.

Method 300 may therefore allow wireless device 103C to update an existing NBKN group with new networks or form a new NBKN group that includes new known networks. The NBKN group includes known networks that are "nearby" the current location of wireless device 103C. Accordingly, in some embodiments, wireless device 103C is capable of automatically joining one or more networks in the NBKN group without requiring user action to join the network.

Network scores allow intelligent auto-join to determine an order in which NBKNs within an NBKN group should be joined by a wireless device. FIG. 4 illustrates a method 400 of exemplary operations for generating a network score for a network, such as an NBKN, according to some embodiments. This disclosure is not limited to this operational description. Rather, it will be apparent to persons skilled in the relevant art(s) from the teachings herein that other operational control flows are within the spirit and scope of the present disclosure. It is to be appreciated that additional operations may be performed. Moreover, not all operations may be needed to perform the disclosure provided herein. Further, some of the operations may be performed simultaneously, or in a different order than shown in FIG. 4, as will be understood by a person of ordinary skill in the art. Some operations can be combined with operations of methods from other figures and/or performed as a single operation. In some implementations, one or more other operations may be performed in addition to or in place of the presently described operations. For illustrative purposes, method 400 of FIG. 4 is described with reference to the embodiments of FIG. 1A and wireless device 103C. However, method 400 is not limited to these embodiments.

An NBKN can be in more than one NBKN group. For example, as previously discussed, a public or omnipresent network can be detected in multiple locations and therefore can be included in (or associated with) multiple NBKN groups. As an illustrative example, a service provider may deploy a public access point (that broadcasts an SSID associated with the service provider) near a home network of a wireless device and another public access point (that broadcasts the same SSID associated with the service provider) near an office network of a wireless device.

In some embodiments, wireless device 103C can store network scores for each NBKN, from which wireless device 103C can select the NBKN with the highest network. In some embodiments, wireless device 103C generates network scores based on any number of factors associated with at least one of user preferences, network performance, and network characteristics. Factors may be weighted, or prioritized, to emphasize factors that are considered more relevant to a user's network preferences. In some embodiments, wireless device 103C may perform method 400 upon connecting to a network and/or receiving updated information regarding any of the weighted factors.

In 401, wireless device 103C may detect one or more user-oriented factors associated with a network, such as network 101A. User-oriented factors can include, but are not limited to, either or both of:

"User Switched To" factor: this factor counts a number of times that a wireless device is manually switched from a currently-connected network to a new network. This count can be used as an indication that the user prefers the new network over the currently-connected network. In some embodiments, the "User Switched To" count may increase a network score for a network. Intelligent auto-join may place more weight on one or more user preferences and therefore can be configured to weight the "User Switched To" factor more heavily when calculating a network score. In some embodiments, the wireless device monitors the received signal strength indicator ("RSSI") associated with the currently-connected network and employs RSSI filtering. If RSSI filtering is enabled, the wireless device increments the "User Switched To" count if the RSSI of the currently-connected network is greater than a predetermined value. For example, a user may walk out of range of a currently-connected network and switch to a different network. Employing RSSI filtering in this situation ensures that the "User Switched To" count does not increment in situations where the wireless device is switched to a new network with a lower RSSI than a previously-joined network.

"User Switched Away" factor: this factor counts a number of times that a wireless device is manually switched away from a currently-connected network. This count can be used as an indication that the user does not prefer the currently-connected network. In some embodiments, the wireless device may employ RSSI filtering before incrementing this count to avoid penalizing networks for coverage-based decisions when, for example, a user switches networks as the wireless device roams out of a network's range. For example, the wireless device can increment this count when the RSSI of the currently-connected network is greater than a predetermined value. In this embodiment when RSSI filtering is employed, the count tracks the number of times a user manually switches away from a currently-connected network even though the signal strength of the currently-connected network is relatively strong. In some embodiments, this factor may decrease a calculation of a network score.

In 402, wireless device 103C may detect one or more network characteristic factors associated with network 101A. Network characteristic factors can include, but are not limited to, factors related to an omnipresent network, a mobile omnipresent network, and/or a location of interest. For example:

"Omnipresent Network" factor: this factor is based on whether a network is an omnipresent network. As discussed above, omnipresent networks are networks associated with public hotspots that broadcast the same SSID and are operated by, for example, the same service provider. In some embodiments, a wireless device may determine whether a network is an omnipresent network using geo-tags associated with the network. In some embodiments, the "Omnipresent Network" factor may receive a negative weight when calculating a network score. FIG. 7 illustrates a diagram of an example wireless communication environment 700 for determining whether a network is an omnipresent network, according to some embodiments. In some embodiments, wireless device 103C may utilize three (or more) geo-tags associated with a network to determine whether the network is an omnipresent network. In the example of three geo-tags, wireless device 103C may determine whether three geo-tags associated with the network fall within an area having a predefined distance from each other. For example, wireless device 103C may determine whether three geo-tags are within 160 meters of each other. If any two of the three geo-tags are separated by more than the predefined distance, then wireless device 103C may characterize the network as an omnipresent network. For example, in FIG. 7, locations 702A-C represent geo-tags associated with a network. Location 702A has coordinates $(x_1, y_1)$, location 702B has coordinates $(x_2, y_2)$, and location 702C has coordinates $(x_3, y_3)$. Center 703 represents the center of a triangle formed by locations 702A-C. An exemplary method to calculate the distance between locations 702A-C includes calculating the diameter of a circle 701 that passes through locations 702A-C. This calculation includes the following:

M1: $(y_2-y_1)/(x_2-x_1)$

M2: $(y_3-y_2)/(x_3-x_2)$ $x_0$: $((M1*M2*y_1)+(M2*x_1)-(M1*x_2))/(M2-M1)$ $y_0$: $(x_1-x_2+M1*y_1)/M1$

Diameter of circle 701=$\sqrt{((x_3-x_0)^2+(y_3-y_0)^2)}$

If the diameter of circle 701 is greater than the predetermined distance (e.g., 160 meters), then the network is characterized as an omnipresent network. In some embodiments, the predetermined distance may be static and predefined by wireless device 103C based on any number of factors, such as predefined network ranges. Additionally or alternatively, the predetermined distance may be dynamically updated based on any number of factors, such as network performance, collected data regarding network ranges, and location accuracy of wireless device 103C. In some embodiments, the "Omnipresent Network" factor may decrease a calculation of a network score because private networks may be preferred over omnipresent networks (e.g., public networks). Because determination of omnipresent networks may include more than one geo-tag assigned to a network, intelligent auto-join may be configured to delay the formation of an NBKN group to provide wireless device 103C a predetermined amount of time to collect data regarding network behaviors and assign geo-tags to networks that have been joined and/or networks that appear in a scan result. As discussed above, in some embodiments, determination of which networks are omnipresent networks is helpful to ensure that NBKN groups are accurately formed. For example, in FIG. 1B, wireless device 103C may have two NBKN groups: a first NBKN group including networks 101A-C and a second NBKN group including networks 101D-E. However, if networks 101B and 101D are not identified as omnipresent networks, wireless device 103C may form only one NBKN group because wireless device 103C may believe network 101B and network 101D are the same network based on these networks broadcasting the same SSID, "Public_SSID." Accordingly, determining whether a network is omnipresent may improve the accuracy of NBKN groups.

"Mobile Omnipresent Network" factor: this factor is associated with mobile networks such as, for example, mobile hotspots. During omnipresent network detection (discussed above), wireless device 103C can differentiate between omnipresent networks and mobile omnipresent networks by examining a basic service set identification ("BSSID") associated with each type of network, which may be the MAC address of a wireless access point. If wireless device 103C detects that the BSSID of the network has not changed after joining a network or if the BSSID has not changed over a predetermined distance travelled by wireless device 103C, wireless device 103C may determine that its network connection is associated with the same mobile hotspot. This is in contrast with omnipresent networks, which are associated with multiple hotspots having different BSSIDs. In some embodiments, the "Mobile Omnipresent Network" may increase a calculation of a network score.

"Location of interest" factor: this factor is associated with wireless device 103C monitoring an amount of time that it is connected to a wireless network near a location of interest ("LOI") such as, for example, a work location or a home location. In some embodiments, wireless device 103C detects an LOI by intermittently detecting networks surrounding a currently-connected network and comparing the detected networks to one another over a period of time. In turn, wireless device 103C may determine the amount of time spent at a particular location based on whether there has been no change in the detected surrounding networks. A location at which wireless device 103C spends longer periods of time may be considered an LOI. For example, wireless device 103C may scan surrounding networks every minute and compare the detected surrounding networks in the scan result to one another every minute. Wireless device 103C may track the time (e.g., number of minutes) where the detected surrounding networks remain the same. The "Location of Interest" factor (e.g., when a network is an LOI network) may increase a calculation of a network's score.

Referring back to FIG. 4, in 403, wireless device 103C may detect one or more network performance factors associated with network 101A. Wireless device 103C may request network performance metrics from a network such as, for example, when connecting to the network. Network performance factors can include, but are not limited to, factors associated with network characteristics:

"Long-term Network" factor: this factor is associated with a duration that wireless device 103C is connected to a network. The network to which any; all of wireless devices 103A-C is connected for a duration longer than a threshold and/or longer relative to other connection durations may be considered a "long-term network." For example, wireless device 103C may monitor the duration (e.g., number of minutes, hours, etc.) it is connected to one, some, or all networks and calculate an average amount of time the device is connected to the network over a predetermined period (e.g., a number of days, weeks, etc.). The network may be characterized as a "long-term network" if the average amount of time the device is connected to the network is longer than a predetermined threshold or is longer relative to other network connections. In some embodiments, the "Long-term Network" factor may increase a calculation of a network score.

"Security Type" factor: this factor relates to whether a network is secured. A calculation of a network score may increase if the network is secured and decrease if the network is unsecured, according to some embodiments.

"TCP Success" factor: wireless device 103C may monitor a TCP success rate of a network. For example, networks that have an average socket level connection success rate over a predetermined threshold (e.g., 90% success rate) may be preferable over other networks. In some embodiments, a TCP success rate over a predetermined threshold increase a calculation of a network score.

"5 GHz Band" factor: 5 GHz bands may have less interference and/or higher network performance than 2.4 GHz bands. Accordingly, networks that support 5 GHz bands may be preferred over other networks. In some embodiments, the "5 GHz Band" factor may increase a calculation of a network score. Discussion of detecting and assigning geo-tags to networks that support 5 GHz bands is discussed in further detail with respect to FIG. 8.

In 404, wireless device 103C may calculate a network score based on one or more of the detected user-oriented factors, network characteristic factors, and network performance factors. One or more other factors may be considered, in addition to or in place of one or more of the factors discussed, when calculating a network score in 404. The foregoing discussion is provided for illustrative purposes, and this disclosure is not limited to those examples. In some embodiments, the network score is calculated based on a count accumulated for each factor considered (or used) and based on a weight assigned to each of those factors. The computed network score may differ, depending on the factors considered and their respectively assigned weights and counts. The weight for each factor is assigned based on an importance of the factor (e.g., negative or positive influence), which either increases or decreases a calculation of the network score. In some embodiments, the network score can be calculated by (i) multiplying an accumulated count for each detected factor by the weight for the respective factor to calculate a score for each detected factor and (ii) summing the calculated scores for the detected factors.

As an illustrative and non-limiting example, Table 1 (below) illustrates factors (with their associated weights) and accumulated counts that are used to calculate network scores for network 101A ("SSID 1"), network 101B ("SSID 2"), and network 101C ("SSID 3").

TABLE 1

Exemplary Network Score Generation

| Factor (weight) | SSID 1 | SSID 2 (Public SSID) | SSID 3 |
|---|---|---|---|
| User Switched To (50) | 2 | 1 | 1 |
| User Switched Away (−15) | 0 | 0 | 1 |

TABLE 1-continued

Exemplary Network Score Generation

| Factor (weight) | SSID 1 | SSID 2 (Public SSID) | SSID 3 |
|---|---|---|---|
| Omnipresent Network (−20) | 0 | 1 | 1 |
| Mobile Omnipresent Network (15) | 0 | 0 | 1 |
| Location of Interest (10) | 1 | 1 | 0 |
| Long-term Network (10) | 1 | 1 | 0 |
| Security Type (20) | 1 | 0 | 1 |
| TCP Success (5) | 1 | 1 | 1 |
| 5 GHz Band (5) | 1 | 1 | 0 |
| Total | 150 | 60 | 55 |

In Table 1, network scores for network 110A, network 101B, and network 101C are calculated using the following exemplary factors and associated weights:

"User Switched To" factor has a weight of 50. This factor is cumulative and tracks a number of times a user switched to a network, as described in further detail above;

"User Switched Away" factor has a weight of −15. This factor is cumulative and tracks a number of times a user switched away from a network, as described in further detail above;

"Omnipresent Network" factor has a weight of −20 if the network is determined to be an omnipresent network;

"Mobile Omnipresent Network" factor has a weight of 15 if the network is determined to be a mobile omnipresent network;

"Location of Interest" factor has a weight of 10 if the network is determined to be associated with a location of interest;

"Long-term Network" factor has a weight of 10 if the network is determined to be a long-term network;

"Security Type" factor has a weight of 20 if the network is determined to implement a predetermined type of security;

"TCP Success" factor has a weight of 5 if the network has a TCP success rate over, for example, a predetermined threshold; and "5 GHz Band" factor has a weight of 5 if the network is determined to support 5 GHz operation.

In some embodiments, each of the "Omnipresent Network," "Mobile Omnipresent Network," "Location of Interest," "Long-term Network," "Security Type," "TCP Success," and "5 GHz Band" factors may have a binary value (e.g., either a "0" or "1").

As discussed above, in some embodiments, the network score for each network 101A, network 101B, and network 101C can be calculated by (i) multiplying an accumulated count for each detected factor by the weight for the respective factor to calculate a score for each detected factor and (ii) summing the calculated scores for the detected factors. For network 101A, a network score can be calculated by:
(i) multiplying an accumulated count for each detected factor by the weight for the respective factor to calculate a score for each detected factor:
a. Score for "User Switched To" factor=2×50=100;
b. Score for "Location of interest" factor=1×10=10;
c. Score for "Long-term Network" factor=1×10=10;
d. Score for "Security Type" factor=1×20=20;
e. Score for "TCP Success" factor=1×5=5; and
f. Score for "5 GHz Band" factor=1×5=5.

(ii) summing the calculated scores for the detected factors: 100+10+10+20+5+5=150.

Network scores for network 101B and 101C can be calculated in a similar manner as the network score for network 101A, which results in a network score of '60' for network 101B and a network score of '55' for network 101C. Accordingly, in the example provided above, network 101A ("SSID 1") is the highest-ranked network in comparison to network 101B ("SSID 2") and network 101C ("SSID 3"). The above factors used to calculate the network scores for network 101A, network 101B, and network 101C and associated weights are merely exemplary and the network scores may be generated using some of the factors (with the same or different weights), other factors, or a combination thereof. Accordingly, the network score computation can consider one or more detected factors, in which the contribution of each factor can be weighted in accordance with the factor's importance. Moreover, other methods for calculating the network score beyond what is illustrated in Table 1 are also within the scope of the present disclosure, such as any other method that calculates a network score based on one or more factors that allow networks within an NBKN group to be ranked.

FIGS. 5A-5B illustrate a method 500 of exemplary operations for performing intelligent auto-join, according to some embodiments. This disclosure is not limited to this operational description. Rather, it will be apparent to persons skilled in the relevant art(s) from the teachings herein that other operational control flows are within the spirit and scope of the present disclosure. It is to be appreciated that additional operations may be performed. Moreover, not all operations may be needed to perform the operations described herein. Further, some of the operations may be performed simultaneously, or in a different order than shown in FIGS. 5A-B, as will be understood by a person of ordinary skill in the art. Some operations can be combined with operations of methods from other figures and/or performed as a single operation. In some implementations, one or more other operations may be performed in addition to or in place of the presently described operations. For illustrative purposes, method 500 is described with reference to embodiments of FIG. 1A and wireless device 103C. However, method 500 is not limited to these embodiments.

In 501, wireless device 103C starts intelligent auto-join. In some embodiments, wireless device 103C stores information associated with at least one NBKN group, where the NBKNs in the NBKN group are ranked based on associated network scores. In 502, wireless device 103C may determine whether location services are enabled in wireless device 103C. If not, wireless device 103C may perform legacy auto-join of a network at 513. In 514, wireless device 103C may determine legacy auto-join was successful and if so, in 515, completes the legacy auto-join by assigning a geo-tag to the joined network.

If location services are enabled, in 503, wireless device 103C may obtain a current location. As noted above, wireless device 103C can utilize any available method for determining its location, including through global positioning system (GPS) features of wireless device 103A, through information obtained through beacons transmitted by one or more access points, and/or through leeched location information.

In 504, wireless device 103C may determine whether the obtained location is current. In some embodiments, wireless device 103C may determine a time at which the obtained location was obtained and compares the time with a current time to calculate a time difference. If the time difference is greater than a predetermined threshold, wireless device 103C may determine that the obtained location is not current (e.g., and thus no longer reliable) and may perform legacy auto-join at 513. For example, the predetermined threshold may be in seconds or minutes.

If the obtained location is current, in 505, wireless device 103C may determine a known network list. In some embodiments, the determination of the known network list includes retrieving a list of networks limited to 5 GHz capability. This list is described in more detail with respect to FIG. 8. In 506, omnipresent networks are removed from the list of known networks. After 506, wireless device 103C may have an updated known network list that does not include omnipresent networks. In 507, wireless device 103C may update an NBKN list to include one or more networks from the updated list of known networks that are within a predetermined distance of the obtained location (e.g., 160 meters)

In 508, wireless device 103C may determine whether there are any NBKN groups known to wireless device 103C (e.g., stored in memory). If yes, in 509, wireless device 103C may select an NBKN group. In some embodiments, if wireless device 103C may be aware of more than one NBKN group, the selection can be based on any criteria (e.g., by NBKN group name, by last NBKN group used, etc.). In 510, wireless device 103C may determine whether there are common networks between the networks in the updated list of known networks and the networks in the selected NBKN group. In some embodiments, common networks are those networks that are known to wireless device 103C, within a predetermined range of the obtained location of wireless device 103C, and are part of an existing NBKN group.

In 511, if there are common networks, wireless device 103C may update the NBKN list to include one or more networks identified in the selected NBKN group. After 511 or if there are no common networks, method 500 returns to 508 where wireless device 103C determines whether there are any remaining NBKN groups to select. If not, in 512, wireless device 103C may determine whether there are networks in the updated NBKN list. If not, wireless device 103C proceeds with legacy auto-join at 513. However, if there are networks in the updated NBKN list, then wireless device 103C proceeds to 516 in FIG. 5B.

In 516, wireless device 103C may add the omnipresent networks which were previously removed from the list of known networks in 506—to the NBKN list. In some embodiments, the NBKN list now includes non-omnipresent networks that are known to wireless device 103C, within a predetermined distance of the obtained location of wireless device 103C, and that are part of an existing NBKN group as well as omnipresent networks that are known to wireless device 103C.

In 517, wireless device 103C may sort the networks within the NBKN list based on respective calculated network scores. For example, wireless device 103C may sort networks 101A-101C in order of their respective network scores of 150, 60, and 55 as described in an example above. In 518, wireless device 103C may select the network with the highest score based on the sorting performed in 517. In 519, wireless device 103C may retrieve and sort a predetermined number of channels that were previously used the selected network. For example, wireless device 103C may retrieve the last 10 channels that were previously used by the selected network. In some embodiments, wireless device 103C may sort the channels based on a most recently used (MRU) order.

In 520, wireless device 103C may select the first channel in the sorted list. In 521, wireless device 103C may perform a channel scan of the selected channel and receive a scan result that includes the networks (if any) detected by the channel scan.

In 522, wireless device 103C may determine whether the selected network (from 518) appears in the scan result. If so, in 523, wireless device 103C attempts to connect to or to associate with the selected network on the selected channel. In 524, wireless device 103 may determine whether the association was successful. If successful, in 534, method 500 ends and wireless device 103C assigns a geo-tag to the connected network. However, if the association is unsuccessful in 524, wireless device 103C proceeds to 525, in which the next channel or channels from the sorted list (generated in 519) may be selected and a channel scan may be performed on the next channel or channels. In some embodiments, wireless device 103C may select the next two channels from the sorted list.

In 526, wireless device 103C may determine whether the selected network (from 518) appears in the channel scan result from 525. If so, in 527, wireless device 103C may attempt to associate with the selected network using the selected next channel. In 528, wireless device 103C may determine whether the association is successful. If successful, in 529, method 500 ends and wireless device 103C assigns a geo-tag to the connected network. However, if the association is unsuccessful, wireless device 103C may proceed to 530 and scans the remaining channels (channels not selected in 520 and 525) from the sorted list (in 519) and receives a scan result that includes the networks received during the channel scan.

In 531, wireless device 103C may attempt to connect to the networks in the scan result based on the order of the sorted list generated in 517. In some embodiments, wireless device 103C sorts the networks from the scan result based on the order of the sorted list and attempts to connect to the networks from the scan result in the sorted order. In 532, wireless device 103C may determine whether an association to any of the networks is successful. If successful, in 529, method 500 ends and wireless device 103C assigns a geo-tag to the connected network. However, if the association is unsuccessful, wireless device 103C proceeds to 533 to scan remaining channels associated with the selected network and channels that were previously scanned as part of operations 521, 525, and 530. Based on the scan results in 533, wireless device 103C may attempt to join a network with the highest network score.

Method 500 may therefore allow wireless device 103C to perform intelligent auto-join to a preferred network that is known to wireless device 103C and based on a location of wireless device 103C without user interaction to manually join or force a connection to a preferred network.

FIGS. 6A-B illustrate method 600 of exemplary operations for performing opportunistic network transitioning, according to some embodiments. This disclosure is not limited to this operational description. Rather, it will be apparent to persons skilled in the relevant art(s) from the teachings herein that other operational control flows are within the spirit and scope of the present disclosure. It is to be appreciated that additional operations may be performed. Moreover, not all operations may be needed to perform the disclosure provided herein. Further, some of the operations may be performed simultaneously, or in a different order than shown in FIGS. 6A-B, as will be understood by a person of ordinary skill in the art. Some operations can be combined with operations of methods from other figures and/or performed as a single operation. In some implementations, one or more other operations may be performed in addition to or in place of the presently described operations. For illustrative purposes, method 600 of FIGS. 6A-B is described with reference to embodiments of FIG. 1A and wireless device 103C. However, method 600 is not limited to these embodiments.

In some embodiments, method 600 is performed when wireless device 103C is not connected to the highest-ranked network (e.g., based on respective network scores). When connected to a lower-ranked network, wireless device 103C may detect an opportunity to transition to a higher-ranked network. The transition may be performed in a manner that will not disrupt other operations and/or events of wireless device 103C.

In 601, wireless device 103C may monitor system events of wireless device 103C. System events may be categorized into application events, device events, and/or network events. Examples of application events include, but are not limited to, a current status of an application, such as whether the application is presently using a current network connection, whether a voice-over-IP (VOIP) call is ongoing, and/or whether a media session is currently streaming. Examples of device events include, but are not limited to, states of components of wireless device 103C, such as whether a display of wireless device 103C is off, whether a Wi-Fi radio of wireless device 103C is currently active, and/or whether wireless device 103C is connected to a Bluetooth device. Examples of network events include, but are not limited to, whether wireless device 103C has roamed beyond a range of a current network connection, whether wireless device 103C has manually switched to or away from the current network, and/or whether wireless device 103C has performed a transition attempt within a predetermined period of time.

In 602, wireless device 103C may determine whether it has detected a system event such as an application event, a device event, or a network event. If not, wireless device 103C continues to monitor system events in 601. If a system event is detected, in 603, wireless device 103C determines whether the system event is a state change event. In some embodiments, the state change event is an event that changes a state of wireless device 103C. Examples of state change events include, but are not limited to, whether a media stream has started or stopped, whether a VOIP call has begun or ended, whether a Bluetooth session has started or stopped, and/or whether a display of wireless device 103C becomes active (e.g., turns on or brightens) or inactive (e.g., turns off or dims). In some embodiments, state change events may act as triggers for determining whether a network transition should take place.

In 604, if the detected system event is not a state change event, then wireless device 103C may update event variables based on the detected system event. Examples of system events that do not change the state of wireless device 103C include, but are not limited to, a roam event (e.g., where wireless device 103C has roamed from one network to another) and/or an addition/deletion of one or more known networks from a known network list on, e.g., wireless device 103C. In some embodiments, event variables track system events that are not determined to be state change events. For example, if a Wi-Fi roam event is detected, wireless device 103C may reset a scan count variable to indicate that wireless device 103C can attempt one or more additional scans. After updating the relevant event variables, wireless device 103C may continue to monitor system events. Examples of event variables can include a scan attempt count, a known locations count, a user switch count, and/or a last scan time.

In 605, if the detected system event is a state change event, wireless device 103C may update a state based on the state change event. In some embodiments, the state is represented using a Boolean variable. For example, if a media stream has started, wireless device 103C updates a media state variable to "True." Conversely, if a media stream has stopped, wireless device 103C can update the media state variable to "False."

In 606, wireless device 103C may determine whether the state change event is a transition event or a trigger for transitioning from the currently-connected network. In some embodiments, the transition event is an event that may indicate that a state of wireless device 103C has changed and a transition from the currently-connected network to another network may be appropriate. For example, the transition event may include, but is not limited to, detecting that the display of wireless device 103C has become inactive, that an application has stopped using a network connection (e.g., a media stream has ended or a VOIP call has ended), that a Bluetooth session has ended, and/or that a Wi-Fi session has ended. If the state change event is not a transition event or a trigger for transitioning from the currently-connected network, wireless device 103C continues to monitor system events at 601.

In 607, if the state change event is a transition event or a trigger for transitioning from the currently-connected network, wireless device 103C may determine whether to attempt to transition from the currently-connected network. The determination in 607 may be based on a number of factors including, but not limited to, determining whether the states and event variables of wireless device 103C are appropriate for the transition. As noted above, the states and event variables should indicate conditions under which any disruption to operations of wireless device 103C is acceptable. For example, wireless device 103C may attempt the network transition when one or more of the following conditions (as determined from the states and event variables of wireless device 103C) are met: (i) the display state indicates that the display of wireless device 103C is inactive; (ii) there is no application currently using the network connection (e.g., there is no active VOIP call or there is no media session being streamed); (iii) the Wi-Fi radio of wireless device is currently on; (iv) wireless device 103C is aware of at least one known network; (v) wireless device 103C was manually switched to the current network; (vi) a transition was not attempted within a predetermined period of time; and (vii) wireless device 103C is not currently connected to a Bluetooth session. In other examples, more, fewer, additional, and/or different conditions can be evaluated in determining whether to attempt the network transition. Examples of states include media playback state, VOIP call state, and application state. Other factors may be considered in determining whether to attempt the network transition in 607.

In 608, after determining there is an appropriate transition opportunity, wireless device 103C may determine its current location through any means such as, for example, through GPS signals, Wi-Fi signals, cellular signals, or leeched location information. If utilizing leeched location information, wireless device 103C may determine whether the leeched location information is valid or otherwise satisfies one or more threshold criteria. For example, wireless device 103C may determine whether the leeched location information is current and/or accurate. As discussed above, in some embodiments, accuracy of the leeched location information can be determined using metadata associated with the leeched location information. The metadata may specify an estimated degree of accuracy associated with the leeched location information, such as in terms of a radius or range from a location (e.g., 25 meters) at which the device is determined to be at the time the leeched location information was originally obtained. If the leeched location information is current and/or a confidence measure (e.g., accuracy) of the leeched location information is within a threshold value (e.g., within meters, tens of meters, etc.), wireless device 103C may use the leeched location as the device's location for the auto-join process. In some embodiments, if the leeched location is not sufficiently current and/or if the confidence measure associated with the leeched location (e.g., accuracy) does not satisfy the threshold value, wireless device 103C may determine its current location through any means such as, for example, Wi-Fi signals, cellular signals, and/or GPS signals.

Having now determined there is an appropriate transition opportunity, operations 609-621 in FIG. 6B describe operations for determining which network wireless device 103C should attempt to auto-join. In 609, wireless device 103C determines whether a previous auto-join attempt utilized location-based NBKN auto-join as described with respect to FIGS. 5A-5B). If not, in 610, wireless device 103C determines whether the detected event (in 602) was a Wi-Fi roam event. In other words, wireless device 103C determines whether it is roaming between networks. If so, wireless device 103C resets the event variable associated with the Wi-Fi roam event in 611. In 612, wireless device 103C generates a network lists that includes known networks based on their geo-tags. In some embodiments, wireless device 103C retrieves networks whose geo-tags are within a predetermined distance (e.g., 160 meters) of the current location of wireless device 103C. In addition, wireless device 103C may also identify one or more NBKN groups associated with the retrieved networks. Accordingly, at this point, wireless device 103C generates the network list that includes networks within a certain distance from the current location (in-range networks), as well as any other networks included in any NBKN groups associated with the in-range networks.

Alternatively, if the detected event is not a Wi-Fi roam event, in 614, wireless device 103C retrieves a sorted network list (e.g., generated in 517) used during the previous intelligent auto join. In some embodiments, the sorted network list is a sorted NBKN list with networks that have been sorted based on respective network scores.

In 613, after determining that the previous auto-join attempt utilized location-based NBKN auto-join (e.g., as described with respect to FIGS. 5A-5B), wireless device 103C may determine whether the current location is more than a predetermined distance (e.g., 30 meters) from the location that was used in the previous intelligent auto join. If the current location is beyond the predetermined distance, wireless device 103C uses the network list generated in 612. If the current location is within the predetermined distance, then wireless device 103C uses the network list generated in 614.

In 615, wireless device 103C may sort the networks in network list (from either 612 or 614) based on respective network scores. Wireless device 103C may further select the highest-ranked network from the network list. In 616, wireless device 103C determines whether the selected network is the same as the network to which wireless device 103C is currently connected. If so, then method 600 ends.

If not, in 617, wireless device 103C may make a determination as to whether to attempt a network transition. In some embodiments, this determination is the same as the determination made in 607. Wireless device 103C checks the relevant states and/or event variables, both of which may indicate that a network transition is appropriate. If a network transition is not appropriate, then wireless device 103C returns to monitoring for system events in 601.

However, if a network transition is appropriate, in 618, wireless device 103C may select at least one channel previously associated with the selected network and scans the selected channel or channels. In some embodiments, wireless device 103C also increments an event variable, such as a scan count variable that tracks the number of scan attempts that have been performed. The wireless device 103C may also update one or more other variables, including an event variable. The event variable can be a last scan time that tracks a time at which the scan has taken place. In some embodiments, event variables are utilized in determining whether to attempt a network transition in 607 and 617.

In 619, wireless device 103C may receive the scan results of the scanned channels and determines whether the selected top network is present in the scan results. If so, in 621, wireless device 103C attempts to associate with the selected top network and disassociates from its currently-connected network. If the selected top network is not present in the scan results, wireless device 103C may determine whether one or more networks in the scan results have a higher network score than the currently-connected network in 620. If so, wireless device 103C can select a network from the scan that has a higher network score and can attempt to associate with the selected network in 621. If not, wireless device 103C returns to monitoring system events in 601.

FIG. 8 is a method 800 of exemplary operations for learning networks limited to 5 GHz operation, according to some embodiments. This disclosure is not limited to this operational description. Rather, it will be apparent to persons skilled in the relevant art(s) from the teachings herein that other operational control flows are within the spirit and scope of the present disclosure. It is to be appreciated that additional operations may be performed. Moreover, not all operations may be needed to perform the disclosure provided herein. Further, some of the operations may be performed simultaneously, or in a different order than shown in FIG. 8, as will be understood by a person of ordinary skill in the art. Some operations can be combined with operations of methods from other figures and/or performed as a single operation. For example, method 800 can be employed in conjunction with method 300 as illustrated in FIGS. 3A-B. In some implementations, one or more other operations may be performed in addition to or in place of the presently described operations. For illustrative purposes, method 800 of FIG. 8 is described with reference to embodiments of FIG. 1A and wireless device 1030. However, method 800 is not limited to these embodiments.

In 801, wireless device 103C may perform a full channel scan as part of intelligent auto-join. As noted above, the full channel scan, or a scan of all Wi-Fi channels of wireless device 103C, of 801 may be performed in conjunction with the channel scan of 301 of FIG. 3A or as a part of a separate channel scan operation. Wireless device 103C receives the scan result from the channel scan. In 802, wireless device 103C may determine whether a network in the scan result is limited to operating in the 5 GHz band. If so, in 803, wireless device 103C may assign a geo-tag to the network based on the current location (e.g., current coordinates of wireless device 103C) and updates a 5 GHz network list to include the network and the geo-tag.

If a known network in the scan result is not limited to 5 GHz (e.g., the known network operates in both 5 GHz and 2.4 GHz bands), in 804, wireless device 103C may determine whether the network and/or geo-tag are present in the 5 GHz list. If so, in 805, wireless device 103C may update the 5 GHz list by removing the known network and/or the associated geo-tag. Otherwise, if the network and geo-tag are not present in the 5 GHz list, method 800 ends.

Various embodiments of wireless devices 103A-C can be implemented, for example, using one or more computer systems, such as computer system 900 shown in FIG. 9. Moreover, computer system 900 can be used, for example, to implement method 300 of FIGS. 3A-B, method 400 of FIG. 4, method 500 of FIGS. 5A-B, method 600 of FIGS. 6A-B, and/or method 800 of FIG. 8. For example, computer system 900 can perform a process for performing intelligent auto-join according to some embodiments described herein. Computer system 900 can be any computer capable of performing the functions described herein.

Computer system 900 can be any well-known computer capable of performing the functions described herein. Computer system 900 includes one or more processors (also called central processing units, or CPUs), such as a processor 904. Processor 904 is connected to a communication infrastructure or bus 906. One or more processors 904 may each be a graphics processing unit (GPU). In some embodiments, a GPU is a specialized processor designed to process mathematically-intensive applications. The GPU may have a parallel structure that is efficient for parallel processing of large blocks of data, such as mathematically intensive data common to computer graphics applications, images, videos, etc.

Computer system 900 also includes user input/output device(s) 903, such as monitors, keyboards, pointing devices, etc., that communicate with communication infrastructure 906 through user input/output interface(s) 902.

Computer system 900 also includes a main or primary memory 908, such as random access memory (RAM). Main memory 908 may include one or more levels of cache. Main memory 908 has stored therein control logic (e.g., computer software) and/or data.

Computer system 900 may also include one or more secondary storage devices or memory 910. Secondary memory 910 may include, for example, a hard disk drive 912 and/or a removable storage device or drive 914. Removable storage drive 914 may be a floppy disk drive, a magnetic tape drive, a compact disk drive, an optical storage device, tape backup device, and/or any other storage device/drive.

Removable storage drive 914 may interact with a removable storage unit 918. Removable storage unit 918 includes a computer usable or readable storage device having stored thereon computer software (control logic) and/or data. Removable storage unit 918 may be a floppy disk, magnetic tape compact disk, DVD, optical storage disk, and/or any other computer data storage device. Removable storage drive 914 reads from and/or writes to removable storage unit 918 in a well-known manner.

According some embodiments, secondary memory 910 may include other means, instrumentalities or other approaches for allowing computer programs and/or other instructions and/or data to be accessed by computer system 900. Such means, instrumentalities or other approaches may include, for example, a removable storage unit 922 and an interface 920. Examples of the removable storage unit 922 and the interface 920 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 900 may further include a communication or network interface 924. Communication interface 924 enables computer system 900 to communicate and interact with any combination of remote devices, remote networks, remote entities, etc. (individually and collectively referenced by reference number 928). For example, communication interface 924 may allow computer system 900 to communicate with remote devices 928 over communications path 926, which may be wired and/or wireless, and which may include any combination of LANs, WANs, the Internet, etc. Control logic and/or data may be transmitted to and from computer system 900 via communication path 926.

In some embodiments, a tangible apparatus or article of manufacture including a tangible computer useable or readable medium having control logic (software) stored thereon is also referred to herein as a "computer program product" or "program storage device." This includes, but is not limited to, computer system 900, main memory 908, secondary memory 910, and removable storage units 918 and 922, as well as tangible articles of manufacture embodying any combination of the foregoing. Such control logic, when executed by one or more data processing devices (such as computer system 900), causes such data processing devices to operate as described herein—e.g., to execute the operations in method 300 of FIGS. 3A-B, method 400 of FIG. 4, method 500 of FIGS. 5A-B, method 600 of FIGS. 6A-B, and/or method 800 of FIG. 8

Based on the teachings contained in this disclosure, it will be apparent to persons skilled in the relevant art(s) how to make and use embodiments of this disclosure using data processing devices, computer systems and/or computer architectures other than that shown in FIG. 9. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

Additionally, embodiments of the disclosure may be implemented in hardware, firmware, software, or any combination thereof. Embodiments of the disclosure may also be implemented as instructions stored on a non-transitory machine-readable medium, which may be read and executed by one or more processors. A non-transitory machine-readable medium may include any mechanism for storing or transmitting information in a form readable by a machine (e.g., a computing device). For example, a non-transitory machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact result from computing devices, processors, controllers, or other devices executing the firmware, software, routines, instructions, etc.

CONCLUSION

It is to be appreciated that the Detailed Description section, and not any other section, is intended to be used to interpret the claims. Other sections can set forth one or more but not all exemplary embodiments as contemplated by the inventors, and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with some embodiments, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A method comprising:
    determining a current location of a wireless device;
    generating a nearby known network (NBKN) list based at least in part on at least one known network the wireless device has previously joined and on the current location of the wireless device;
    selecting a candidate network from the NBKN list based at least in part on a network score assigned to the candidate network;
    scanning a previously-used channel associated with the candidate network to generate a scan result;
    attempting to join the candidate network in response to the candidate network being included in the scan result;
    responsive to successfully joining the candidate network, assigning a geo-tag to the candidate network;
    determining that the candidate network is an omnipresent network based at least in part on the geo-tag and at least one other geo-tag previously assigned to the candidate network; and
    updating the network score responsive to determining that the candidate network is the omnipresent network, wherein the updating comprises excluding, based on determining that the candidate network is the omnipresent network, the candidate network from the NBKN list.

2. The method of claim 1, further comprising:
    generating a known network list comprising one or more known networks the wireless device has previously joined, including the at least one known network;
    generating an updated known network list by removing, from the known network list, a network determined to be farther than a predetermined distance from the current location of the wireless device; and
    generating an updated NBKN list based at least in part on the updated known network list and the NBKN list.

3. The method of claim 2, further comprising:
    selecting an NBKN group;
    determining that the at least one known network is included in the NBKN group; and
    revising the updated NBKN list to include one or more networks in the NBKN group based at least in part on the determining that the at least one known network is included in the NBKN group.

4. The method of claim 1, further comprising:
    monitoring a location request transmitted by an application of the wireless device;
    monitoring a response to the location request received by the application of the wireless device, wherein the response includes a leeched location of the wireless device; and
    storing the leeched location of the wireless device in a memory of the wireless device, wherein determining the current location of the wireless device comprises retrieving the leeched location of the wireless device from the memory of the wireless device.

5. The method of claim 1, further comprising:
    determining that the wireless device has joined the candidate network; and
    updating location information of the candidate network by associating the current location of the wireless device with the candidate network, wherein the current location is stored as the geo-tag associated with the candidate network.

6. The method of claim 1, further comprising:
    calculating the network score based at least in part on one or more weighted factors associated with the at least one known network, wherein the one or more weighted factors include at least one of:
        a first count indicating a number of times the wireless device has been switched to the at least one known network;

a second count indicating a number of times the wireless device has switched away from the at least one known network;

an omnipresent parameter indicating whether the at least one known network is the omnipresent network; or a network performance factor of the at least one known network; and assigning the network score to the at least one known network.

7. The method of claim further comprising:

scanning at least one most recently used channel associated with the candidate network in response to the candidate network not being included in the scan result;

generating an additional scan result based at least in part on the scanning the at least one most recently used channel; and attempting to join the candidate network in response to the candidate network being included in the additional scan result.

8. The method of claim 1, further comprising:

detecting a transition state of the wireless device; and attempting to join the candidate network based at least in part on the transition state.

9. The method of claim 8, wherein detecting the transition state of the wireless device comprises:

determining that the wireless device is communicatively connected to a first network, wherein the first network is different from the candidate network; and identifying a transition opportunity based at least in part on the transition state, wherein the transition state is based at least in part on a condition associated with the wireless device, the condition including at least one of: a display state of the wireless device, a Wi-Fi roam event, a media playback state of the wireless device, an application state, a last scan time, or a scan count, and wherein the transition opportunity indicates an opportunity for transitioning from the first network to the candidate network.

10. The method of claim 1, wherein determining that the candidate network is the omnipresent network based at least in part on the geo-tag comprises:

calculating a distance between the geo-tag and the at least one other geo-tag assigned to the candidate network; and determining that the distance exceeds a predetermined distance value.

11. A wireless device, comprising:

a memory configured to store instructions;

a processor, that when executing the instructions, is configured to perform operations comprising:

determining a current location of the wireless device;

generating a nearby known network (NBKN) list based at least in part on at least one known network the wireless device has previously joined and on the current location of the wireless device;

selecting a candidate network from the NBKN list based at least in part on a network score assigned to the candidate network;

scanning a previously-used channel associated with the candidate network to generate a scan result;

attempting to join the candidate network in response to the candidate network being included in the scan result;

responsive to successfully joining the candidate network, assigning a geo-tag to the candidate network;

determining that the candidate network is an omnipresent network based on the geo-tag and at least one other geo-tag previously assigned to the candidate network; and updating the network score responsive to determining that the candidate network is the omnipresent network, wherein the updating comprises excluding, based on determining that the candidate network is the omnipresent network, the candidate network from the NBKN list.

12. The wireless device of claim 11, wherein the operations further comprise:

generating a known network list comprising one or more known networks the wireless device has previously joined, including the at least one known network;

generating an updated known network list by removing, from the known network list, a network determined to be farther than a predetermined distance from the current location of the wireless device; and generating an updated NBKN list based at least in part on the updated known network list and the NBKN list.

13. The wireless device of claim 12, wherein the operations further comprise:

selecting an NBKN group;

determining that the at least one known network is included in the NBKN group; and revising the updated NBKN list to include one or more networks in the NBKN group based at least in part on the determining that the at least one known network is included in the nearby network group.

14. The wireless device of claim 11, wherein the operations further comprise:

monitoring a location request transmitted by an application of the wireless device;

monitoring a response to the location request received by the application of the wireless device, wherein the response includes a leeched location of the wireless device; and storing the leeched location of the wireless device in the memory of the wireless device, wherein determining the current location of the wireless device comprises retrieving the leeched location of the wireless device from the memory of the wireless device.

15. The wireless device of claim 11, wherein the operations further comprise:

determining that the wireless device has joined the candidate network; and updating location information of the candidate network by associating the current location of the wireless device with the candidate network, wherein the current location is stored as the geo-tag associated with the candidate network.

16. The wireless device of claim 11, wherein the operations further comprise:

calculating a first network score based at least in part on one or more weighted factors associated with the at least one known network, wherein the one or more weighted factors include at least one of:

a first count indicating a number of times that the wireless device has been switched to the at least one known network;

a second count indicating a number of times that the wireless device has switched away from the at least one known network;

an omnipresent parameter indicating whether the at least one known network is the omnipresent network; or a network performance factor of the at least one known network; and assigning the first network score to the at least one known network.

17. A non-transitory computer-readable medium having instructions stored thereon that, when executed by a wireless device, cause the wireless device to perform operations comprising:

determining a current location of the wireless device;

generating a nearby known network (NBKN) list based at least in part on at least one known network the wireless device has previously joined and on the current location of the wireless device;

selecting a candidate network from the NBKN list based at least in part on a network score assigned to the candidate network;

scanning a previously-used channel associated with the candidate network to generate a scan result;

attempting to join the candidate network in response to the candidate network being included in the scan result;

responsive to successfully joining the candidate network, assigning a neo-tag to the candidate network;

determining that the candidate network is an omnipresent network based on the geo-tag and at least one other geo-tag previously assigned to the candidate network; and updating the network score responsive to determining that the candidate network is the omnipresent network, wherein the updating comprises excluding, based on determining that the candidate network is the omnipresent network, the candidate network from the NBKN list.

18. The non-transitory computer-readable medium of claim 17, wherein the operations further comprise:

generating a known network list comprising one or more known networks the wireless device has previously joined, including the at least one known network;

generating an updated known network list by removing, from the known network list, a network determined to be farther than a predetermined distance from the current location of the wireless device; and generating an updated NBKN list based at least in part on the updated known network list and the NBKN list.

19. The non-transitory computer-readable medium of claim 17, wherein the operations further comprise:

detecting a transition state of the wireless device; and attempting to join the candidate network based at least in part on the transition state.

20. The non-transitory computer-readable medium of claim 19 wherein detecting the transition state of the wireless device comprises:

determining that the wireless device is communicatively connected to a first network, wherein the first network is different from the candidate network; and identifying a transition opportunity based at least in part on the transition state, wherein the transition state is based at least in part on a condition associated with the wireless device, the condition including at least one of: a display state of the wireless device, a Wi-Fi roam event, a media playback state of the wireless device, an application state, a last scan time, or a scan count, and wherein the transition opportunity indicates an opportunity for transitioning from the first network to the candidate network.

21. The non-transitory computer-readable medium of claim 17, wherein the operations further comprise:

scanning at least one most recently used channel associated with the candidate network in response to the candidate network not being included in the scan result;

generating an additional scan result based at least in part on the scanning the at least one most recently used channel; and attempting to join the candidate network in response to the candidate network being included in the additional scan result.

* * * * *

UNITED STATES PATENT AND TRADEMARK OFFICE
CERTIFICATE OF CORRECTION

PATENT NO.         : 10,616,928 B2
APPLICATION NO.    : 15/717053
DATED              : April 7, 2020
INVENTOR(S)        : Pallen et al.

Page 1 of 1

It is certified that error appears in the above-identified patent and that said Letters Patent is hereby corrected as shown below:

In the Claims

Claim 17, Column 33, Line 22, "assigning a neo-tag to the" should read --assigning a geo-tag to the--.

Signed and Sealed this
Fourth Day of August, 2020

Andrei Iancu
*Director of the United States Patent and Trademark Office*